United States Patent
Yang et al.

(10) Patent No.: US 7,974,484 B2
(45) Date of Patent: Jul. 5, 2011

(54) JBIG CODING AND DECODING SYSTEM

(75) Inventors: Mine-Ta Yang, Hsinchu (TW); Wen-Cheng Ho, Shigang Shiang (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 878 days.

(21) Appl. No.: 12/000,041

(22) Filed: Dec. 7, 2007

(65) Prior Publication Data
US 2008/0137974 A1    Jun. 12, 2008

(30) Foreign Application Priority Data
Dec. 7, 2006  (TW) ............................... 95145570 A

(51) Int. Cl.
   G06K 9/46  (2006.01)
   G06K 9/36  (2006.01)
(52) U.S. Cl. ...................................... 382/247
(58) Field of Classification Search ................ 382/232, 382/233, 238, 247; 341/50–52, 61, 67, 106, 341/107; 375/E7.144, E7.226, E7.231
See application file for complete search history.

(56) References Cited

U.S. PATENT DOCUMENTS

| | | | |
|---|---|---|---|
| 5,414,423 A * | 5/1995 | Pennebaker | 341/107 |
| 5,577,132 A * | 11/1996 | Yokose et al. | 382/238 |
| 5,751,859 A * | 5/1998 | Howard | 382/238 |
| 5,781,136 A * | 7/1998 | Imanaka et al. | 341/107 |
| 5,859,604 A * | 1/1999 | Slattery et al. | 341/107 |
| 6,870,491 B2 * | 3/2005 | Thaly | 341/50 |
| 2001/0015825 A1 * | 8/2001 | Ayabe | 358/261.2 |
| 2008/0137974 A1 * | 6/2008 | Yang et al. | 382/247 |

* cited by examiner

Primary Examiner — Amir Alavi
(74) Attorney, Agent, or Firm — Bacon & Thomas, PLLC

(57) ABSTRACT

A Joint Bi-level Image Group (JBIG) coding and decoding system, which provides a series of fully serial and parallel computational combinations in arithmetic coding and decoding to thereby reduce the complexity of JBIG arithmetic encoder and decoder and increase the processing speed. The JBIG coding system receives pixels and contexts of an image datastream and performs an adaptive arithmetic coding on the pixels in accordance with a pre-stored table and a probability prediction table for further performing a non-distortion compression on the image datastream. The JBIG decoding system receives data and contexts of a compressed datastream and performs an adaptive arithmetic decoding on the data of the compressed datastream in accordance with the pre-stored table and the probability prediction table to thereby obtain an image datastream.

39 Claims, 16 Drawing Sheets

JBIG CODING AND DECODING SYSTEM

BACKGROUND OF THE INVENTION

1. Field of the Invention

The present invention relates to the technical field of digital image coding and decoding and, more particularly, to a Joint Bi-level Image Group (JBIG) coding and decoding system.

2. Description of Related Art

The well-known bi-level image compression standard is G3 and G4 fax compression standards. Upon the strong requirement in office automation (OA), a facsimile machine has become a newly popular office machine. However, the use limitation of such a facsimile machine may cause the problems as follows.

(1) The terminals have different resolutions. Current computer terminals do not include an entire fax document in the screen on display due to the resolution restriction.

(2) The function of browsing image data in real-time is not provided. Namely, the content can be read only when the entire image sheet is completely output by a facsimile machine.

(3) When a gray-level image is input, the output image quality is very poor. This is because the gray-level contrast data of the gray-level image is damaged when a facsimile machine performs a binary evaluation on a document that is input as a gray-level image to thereby obtain a bi-level image for further processing, and accordingly the output quality of the bi-level image is poor.

Therefore, a satisfactory bi-level image compression must have the capability of solving the aforementioned problems.

The Joint Bi-level Image Group (JBIG) is similar to the Joint Photographic Experts Group (JPEG) except that the JBIG applies a non-distortion compression and accordingly the compressed bi-level image can be restored completely.

The JBIG is operated by sending a version of image with low resolution and the additional compressed image data in accordance with the needs of the subjective and objective environments in order to enhance the quality of the blur image and gradually restore the original image, which is referred to as the function of JBIG progressive transfer. The JBIG compression has the following features:

(1) adaptive coding;
(2) lossless compression;
(3) progressive capability; and
(4) multi-level image processing capability.

The JBIG coding uses an adaptive arithmetic coding, so the effect of adaptive coding is obtained. The JBIG also regards a multi-level image as multiple bi-level images in order to compress, store and transfer each of the multiple bi-level images. Thus, the multi-level image can be processed by the JBIG In addition, the JBIG involves the halftone image compression and coding.

FIG. 1 is a schematic diagram of a typical JBIG coding system 100. As shown in FIG. 1, the JBIG coding system 100 receives a pixel PIX and the context CX corresponding to the pixel, which are applied to an adaptive arithmetic coding to thereby obtain a compressed data SCD.

FIG. 2 is a schematic diagram of a context corresponding to the pixel of FIG. 1. FIG. 3 is a schematic diagram of another context corresponding to the pixel of FIG. 1. As shown in FIGS. 2 and 3, "?" indicates the pixel to be input and coded, which is not a part of the context, and "A" indicates an adaptive pixel, which is a part of the context.

FIG. 4 is a flowchart of a typical JBIG coding. As shown in FIG. 4, the procedure INITENC is called to perform an initialization (step S410). The pixel PIX, the context CX and two values TPVALUE and DPVALUE are read (step S420). Step S430 determines if TPVALUE is not equal to two or DPVALUE is not equal to two. Step S450 is executed when TPVALUE is not equal to two or DPVALUE is not equal to two, and otherwise step S440 is executed to call the procedure ENCODE for coding. Step S450 determines if a strip of image is coded completely. The procedure FLUSH is called when the strip of image is coded completely, and otherwise step S420 is executed.

FIG. 5 is a flowchart of the procedure INITENC of FIG. 4.

FIG. 6 is a flowchart of the procedure ENCODE of FIG. 4.

FIG. 7 is a schematic diagram of a typical JBIG decoding system 200. As shown in FIG. 7, the JBIG decoding system receives a compressed data SCD and associated context CX and performs the adaptive arithmetic decoding on the received data and context to thereby produce the pixel PIX.

FIG. 8 is a flowchart of a typical JBIG decoding. As shown in FIG. 8, the procedure INITDEC is called to perform an initialization (step S1310). The compressed data SCD, the context CX and two values TPVALUE and DPVALUE are read (step S1320). Step S1330 determines if TPVALUE is not equal to two. The pixel PIX is set to the value TPVALUE (step S1340) when TPVALUE is not equal to two, and step S1350 is executed when TPVALUE is equal to two. Step S1350 determines if DPVALUE is not equal to two. The pixel PIX is set to the value DPVALUE (step S1360) when DPVALUE is not equal to two, and step S1370 is executed when DPVALUE is equal to two.

In step S1370, the procedure ENCODE is called to decode. Step S1380 determines if a strip of image is decoded completely. Step 1310 is executed when the strip of image is decoded completely, and otherwise step S1320 is executed.

FIG. 9 is a flowchart of the procedure INITDEC of FIG. 8.

FIG. 10 is a flowchart of the procedure DECODE of FIG. 8.

Accordingly, the JBIG encoder and decoder essentially use the adaptive arithmetic coding and decoding in compression and decompression. The adaptive arithmetic coding and decoding can provide a better compression effect, as compared to Huffman, modified Huffman (MH), modified READ (MR), modified modified READ (MMR) algorithms, but the time required for the operation is more than the cited algorithms.

To overcome the aforementioned problem, U.S. Pat. No. 6,870,491 granted to Thaly Amogh D. for a "Data decompression technique for image processing" discloses a fast data conversion, which decompresses the compressed data obtained after the arithmetic coding. In U.S. Pat. No. 6,870, 491, a series of serial and parallel computational combinations is performed on the compressed data to thereby reduce the required decompression time. Also, the applied parallel processing can further reduce the required decompression time. However, the serial and parallel computational combinations are a partial arithmetic decoding, which can only reduce the limited time. In addition, this patent has focused only on the decompression, without describing the compression.

Therefore, it is desirable to provide an improved JBIG encoder and decoder to mitigate and/or obviate the aforementioned problems.

SUMMARY OF THE INVENTION

The object of the present invention is to provide a Joint Bi-level Image Group (JBIG) coding and decoding system, which provides a series of complete serial and parallel computational combinations in arithmetic coding and decoding to thereby reduce the complexity of JBIG arithmetic encoder and decoder and increase the processing speed.

In accordance with one aspect of the present invention, there is provided a Joint Bi-level Image Group (JBIG) coding system. The JBIG coding system includes a first receiver, a first lookup table device, a second lookup table device, an encoder and an output device. The first receiver receives a datastream which contains at least one pixel and a context corresponding to the pixel. The first lookup table device is connected to the first receiver in order to obtain a state (ST) and a more probable symbol (MPS) by looking up a table in accordance with the context. The second lookup table device is connected to the first lookup table device in order to obtain a less probable symbol size (LSZ), a next less probable symbol (NPLS), a next more probable symbol (NMPS) and a switch by looking up a probability estimation table in accordance with the state. The encoder is connected to the first receiver and the second lookup table device in order to perform an arithmetic coding on the pixel in accordance with the pixel, the LSZ, the NPLS, the NMPS and the switch to accordingly produce a compressed data corresponding to the pixel and set parameters A and C, where the parameter A indicates a interval between zero and one and the parameter C indicates a bottom of the interval. The output device is connected to the encoder in order to normalize the parameters A and C and output the compressed data corresponding to the pixel.

In accordance with another aspect of the present invention, there is provided a Joint Bi-level Image Group (JBIG) decoding system. The JBIG decoding system includes a second receiver, a third lookup table device, a fourth lookup table device, a decoder and a normalizer. The second receiver receives a compressed datastream which contains at least one image compressed data and a context corresponding to the image compressed data. The third lookup table device is connected to the second receiver in order to obtain a state and a more probable symbol (MPS) by looking up a table in accordance with the context. The fourth lookup table device is connected to the third lookup table device in order to obtain a less probable symbol size (LSZ), a next less probable symbol (NPLS), a next more probable symbol (NMPS) and a switch by looking up a probability. estimation table in accordance with the state. The decoder is connected to the second receiver and the fourth lookup table device in order to perform an arithmetic decoding on the image compressed data in accordance with the image compressed data, the LSZ, the NPLS, the NMPS and the switch to accordingly produce a pixel corresponding to the image compressed data and set parameters A and C, where the parameter A indicates an interval between zero and one and the parameter C indicates a bottom of the interval. The normalizer is connected to the decoder in order to normalize the parameters A and C and output the pixel corresponding to the image compressed data.

Other objects, advantages, and novel features of the invention will become more apparent from the following detailed description when taken in conjunction with the accompanying drawings.

DETAILED DESCRIPTION OF THE PREFERRED EMBODIMENT

Figure 11:
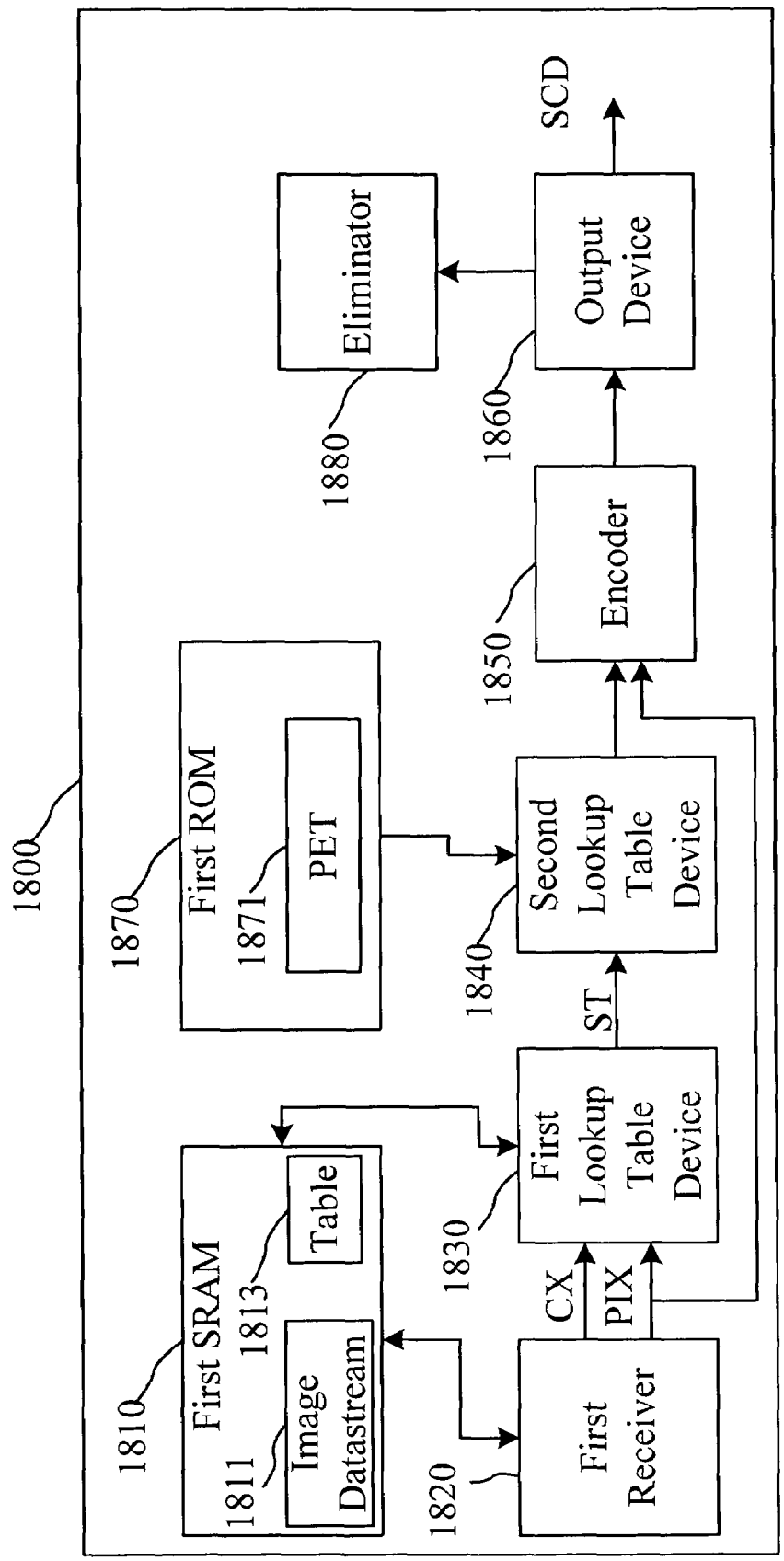
FIG. 11 is a block diagram of a JBIG coding system in accordance with the invention.

FIG. 11 is a block diagram of a JBIG coding system 1800 in accordance with the invention. As shown in FIG. 11, the system 1800 includes a first receiver 1820, a first lookup table device 1830, a second lookup table device 1840, an encoder 1850, an output device 1860, a first static random access memory (SRAM) 1810, a first read-only memory (ROM) 1870 and an eliminator 1880.

Figure 12:
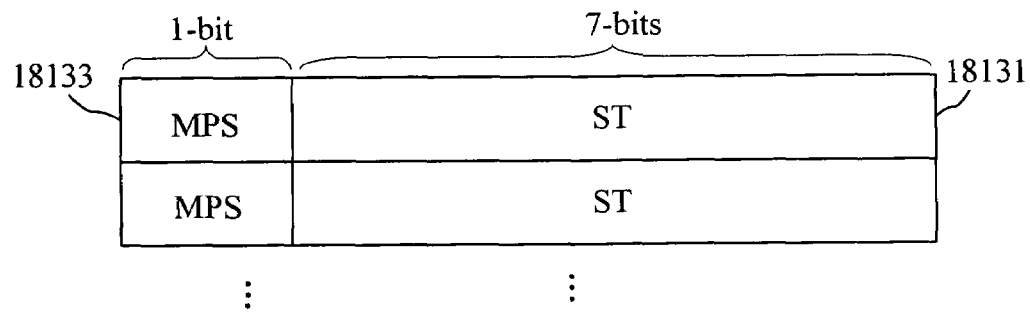
FIG. 12 is a schematic diagram of a table in accordance with the invention.

The first SRAM 1810 stores an image datastream 1811 and a table 1813. FIG. 12 is a schematic diagram of the table 1813. The table 1813 has a plurality of state (ST) fields 18131 and more probable symbol (MPS) fields 18133. Each of the state fields 18131 has seven bits, and each of the MPS fields 18133 has one bit.

The first receiver 1820 is connected to the first SRAM 1810 in order to receive the datastream 1811. The datastream 1811 contains at least one pixel PIX and a context CX corresponding to the pixel PIX.

The first lookup table device 1830 is connected to the first SRAM 1810 and the first receiver 1820 in order to obtain a corresponding state and MPS by looking up the table 1813 based on the context CX. The context CX contains 10 pixels, so the table 1813 has $2^{10}$ state fields 18131 and $2^{10}$ MPS fields 18133. The first lookup table device 1830 depends on the context CX to look up the corresponding state 18131 and MPS 18133.

Figure 13:
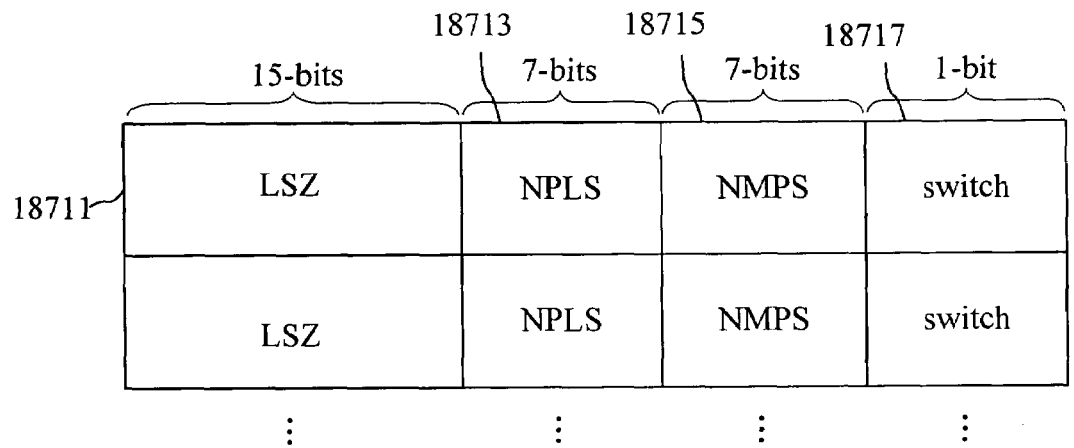
FIG. 13 is a schematic diagram of a probability estimation table in accordance with the invention.

The first ROM 1870 stores a probability estimation table (PET) 1871. FIG. 13 is a schematic diagram of the probability estimation table 1871. As shown in FIG. 13, the PET 1871 has a plurality of less probable symbol size (LSZ) fields 18711, next less probable symbol (NPLS) fields 18713, next more probable symbol (NMPS) fields and switch fields 18717.

The second lookup table device 1840 is connected to the first lookup table device 1830 and the first ROM 1870 in order to obtain an LSZ, a NPLS, a NMPS and a switch by looking up the PET 1871 based on the state.

In this embodiment, the PET 1871 is stored in the first ROM 1870. In other embodiments, the PET 1871 can be stored in the first SRAM 1810.

The encoder 1850 is connected to the first receiver 1820 and the second lookup table device 1840 in order to perform an arithmetic coding on the pixel PIX in accordance with the pixel PIX, the LSZ, the NPLS, the NMPS and the switch to accordingly produce a compressed data corresponding to the pixel PIX and set parameters A and C, where the parameter A indicates an interval between zero and one and the parameter C indicates a bottom of the interval.

The output device 1860 is connected to the encoder 1850 in order to normalize the parameters A and C and output the compressed data SCD corresponding to the pixel PIX. The eliminator 1880 is connected to the output device 1860 in order to set the parameter C.

Figure 14:
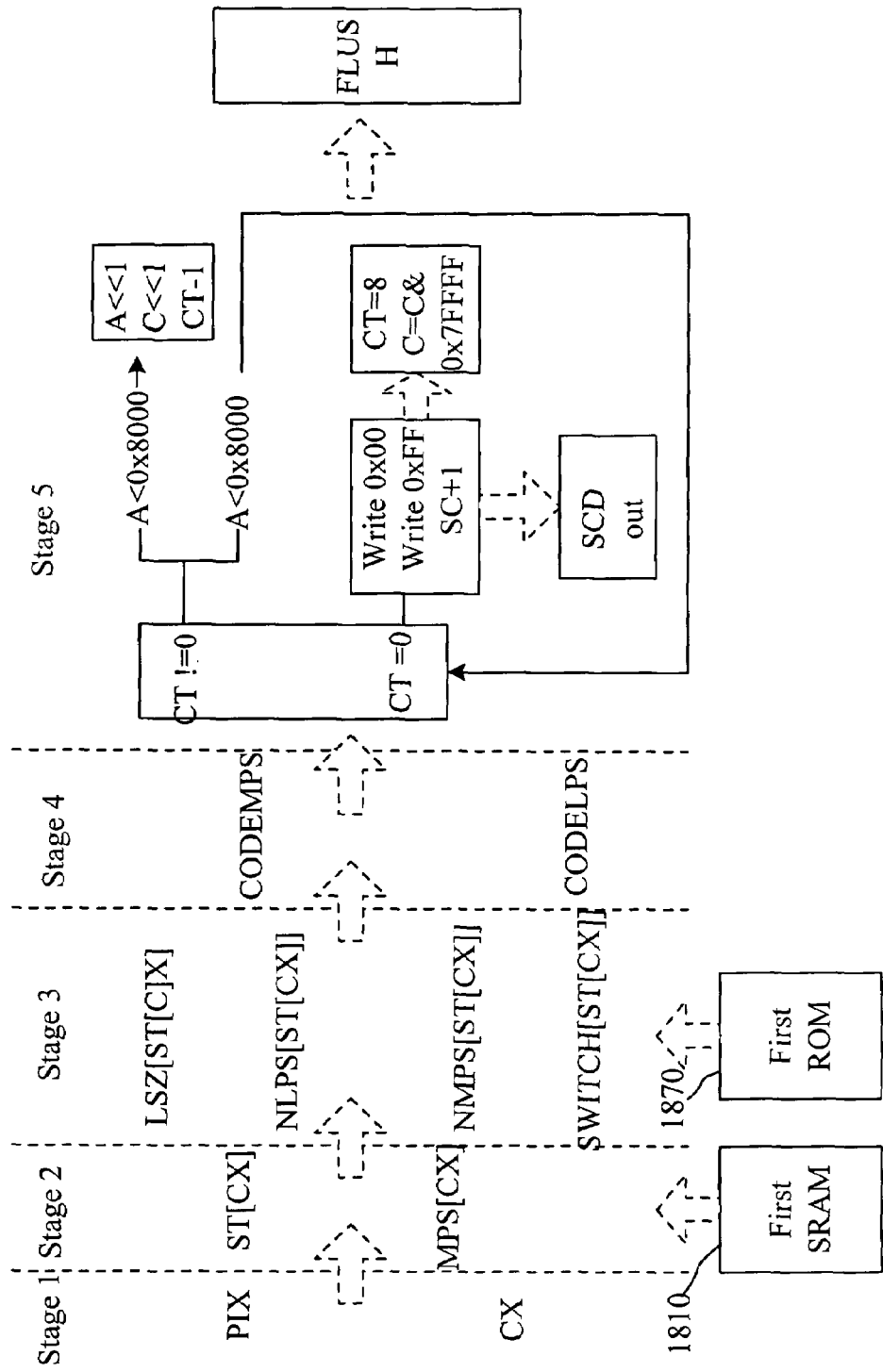
FIG. 14 is a schematic diagram of an operation of the JBIG coding system of FIG. 11 in accordance with the invention.

FIG. 14 is a schematic diagram of an operation of the JBIG coding system 1800 in accordance with the invention. As shown in FIG. 14, the hardware of the JBIG coding system 1800 uses a pipeline operation to perform the JBIG coding to thereby increase the coding speed. In this case, Stage 1 corresponds to the operation of the first receiver 1820, Stage 2 corresponds to the operation of the first lookup table device 1830, Stage 3 corresponds to the operation of the second lookup table device 1840, Stage 4 corresponds to the operation of the encoder 1850, and Stage 5 corresponds to the operation of the output device 1860.

Figure 15:
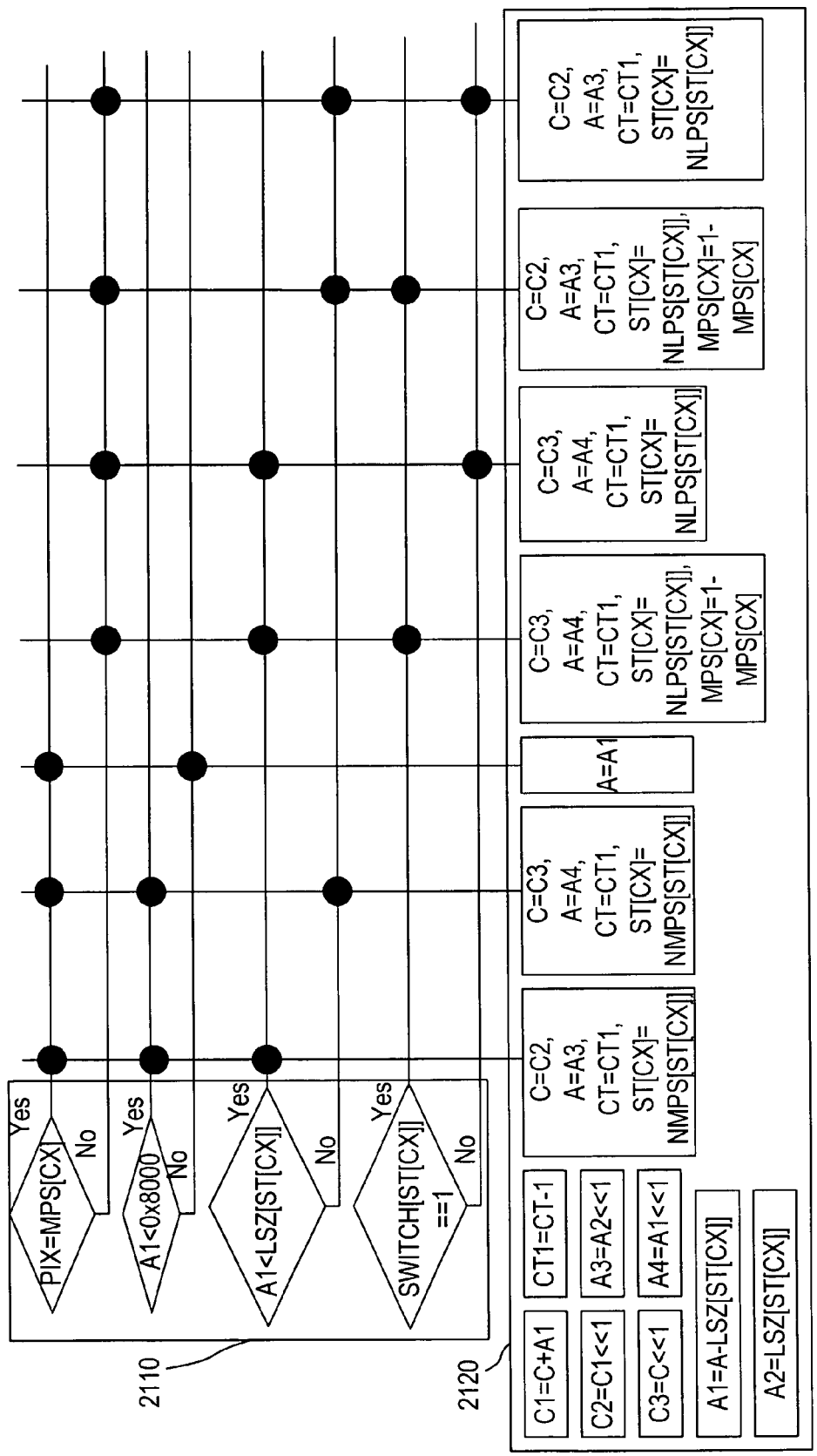
FIG. 15 is a block diagram of an encoder in accordance with the invention.

FIG. 15 is a block diagram of the encoder 1850 in accordance with the invention. As shown in FIG. 15, the encoder 1850 includes a first comparison logic 2110 and a first setting logic 2120. The first setting logic 2120 sets the parameter A, the parameter C and a bit counter based on a comparison result of the first comparison logic 2110, and updates the state fields and MPS fields of the table 1813.

As shown in FIG. 15, the first comparison logic 2110 compares the pixel PIX with the MPS (i.e., MPS[CX]), a parameter A1 with 0x8000 and the LSZ (i.e., LSZ[ST[CX]]), and the switch with one, where A1=A−LSZ[ST[CX]] for A to indicate the parameter A, LSZ to indicate the less probable symbol size, ST to indicate the state and CX to indicate the context, and LSZ[ST[CX]] is obtained by looking up the PET 1871 based on the state.

When the pixel PIX is equal to MPS[CX] and the parameter A1 is smaller than 0x8000 and LSZ[ST[CX]], the first setting logic 2120 sets the parameter C=(C+A1)<<1, the parameter A=LSZ[ST[CX]]<<1 and the bit counter to CT−1, and updates the state field of the table 1813 as ST[CX] =NMPS[ST[CX]], where A indicates the parameter A, C indicates the parameter C, << indicates a left shift operation, CX indicates the context, ST indicates the state, NMPS indicates the next more probable symbol, and CT indicates a value of the bit counter.

When the pixel PIX is equal to MPS[CX], the parameter A1 is smaller than 0x8000 but not smaller than LSZ[ST [CX]], the first setting logic 2120 sets the parameter C=C<<1, the parameter A=(A−LSZ[ST[CX]])<<1 and the bit counter to CT−1, and updates the state field of the table 1813 as ST[CX]=NMPS[ST[CX]], where A indicates the parameter A, C indicates the parameter C, LSZ indicates the less probable symbol size, << indicates a left shift operation, CX indicates the context, ST indicates the state, NMPS indicates the next more probable symbol, and CT indicates a value of the bit counter.

When the pixel PIX is equal to MPS[CX] and the parameter A1 is not smaller than 0x8000, the first setting logic 2120 sets the parameter A=A1, where A1 indicates the parameter A1.

When the pixel PIX is not equal to MPS[CX], the parameter A1 is smaller than LSZ[ST[CX]] and the switch is equal to one, the first setting logic 2120 sets the parameter C=C<<1, the parameter A=(A−LSZ)<<1, and the bit counter to CT−1, and updates the state and MPS fields of the table 1813 as ST[CX]=NLPS[ST[CX]] and MPS[CX]=(1−MPS[CX]), where A indicates the parameter A, C indicates the parameter C, LSZ indicates the less probable symbol size, << indicates a left shift operation, CX indicates the context, ST indicates the state, NLPS indicates the next less probable symbol, and CT indicates a value of the bit counter.

When the pixel PIX is not equal to MPS[CX], the parameter A1 is smaller than LSZ[ST[CX]], and the switch is not equal to one, the first setting logic 2120 sets the parameter C=C<<1, the parameter A=(A−LSZ)<<1 and the bit counter to CT−1, and updates the state field of the table as ST[CX]= NLPS[ST[CX]], where A indicates the parameter A, C indicates the parameter C, LSZ indicates the less probable symbol size, << indicates a left shift operation, CX indicates the context, ST indicates the state, NLPS indicates the next less probable symbol, and CT indicates a value of the bit counter.

When the pixel PIX is not equal to MPS[CX], the parameter A1 is not smaller than LSZ[ST[CX]], and the switch is equal to one, the first setting logic 2120 sets the parameter C=(C+A1)<<1, the parameter A=LSZ[ST[CX]]<<1 and the bit counter to CT−1, and updates the state and MPS fields of the table 1813 as ST[CX]=NLPS[ST[CX]] and MPS[CX]= (1−MPS[CX]), where A1 indicates the parameter A1, C indicates the parameter C, LSZ indicates the less probable symbol size, << indicates a left shift operation, CX indicates the context, ST indicates the state, NLPS indicates the next less probable symbol, MPS indicates the more probable symbol, and CT indicates a value of the bit counter.

When the pixel PIX is not equal to MPS[CX], the parameter A1 is not smaller LSZ[ST[CX]], and the switch is not equal to one, the first setting logic 2120 sets the parameter C=(C+A1)<<1, the parameter A=LSZ[ST[CX]]<<1, and the bit counter to CT−1, and updates the state field of the table as ST[CX]=NLPS[ST[CX]], where A1 indicates the parameter A1, C indicates the parameter C, LSZ indicates the less probable symbol size, << indicates a left shift operation, CX indicates the context, ST indicates the state, NLPS indicates the next less probable symbol, and CT indicates a value of the bit counter.

Figures 1, 2, 3:
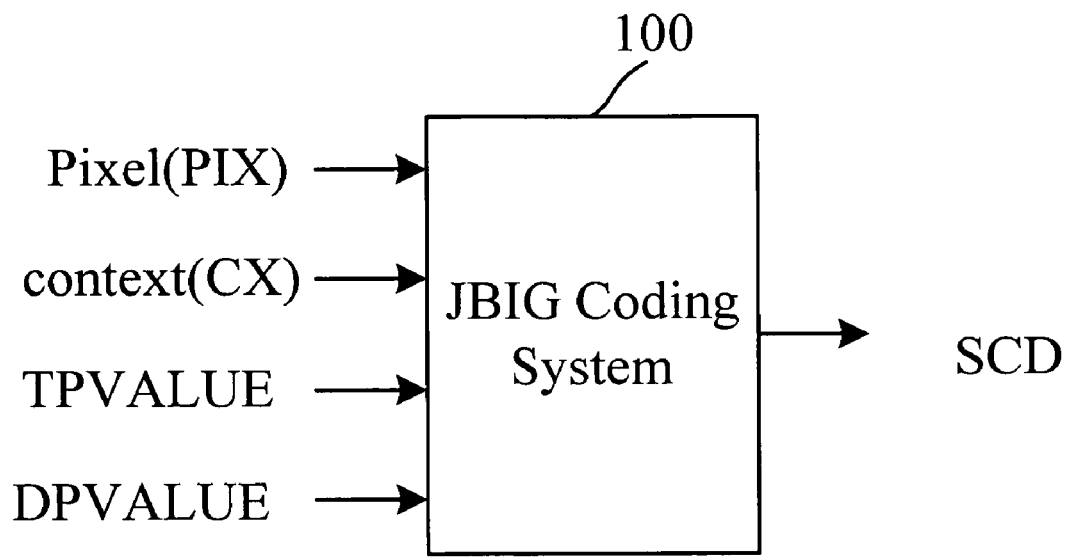
FIG. 1 is a schematic diagram of a typical JBIG coding system.
FIG. 2 is a schematic diagram of a context corresponding to the pixel of FIG. 1.
FIG. 3 is a schematic diagram of another context corresponding to the pixel of FIG. 1.
Figure 4:
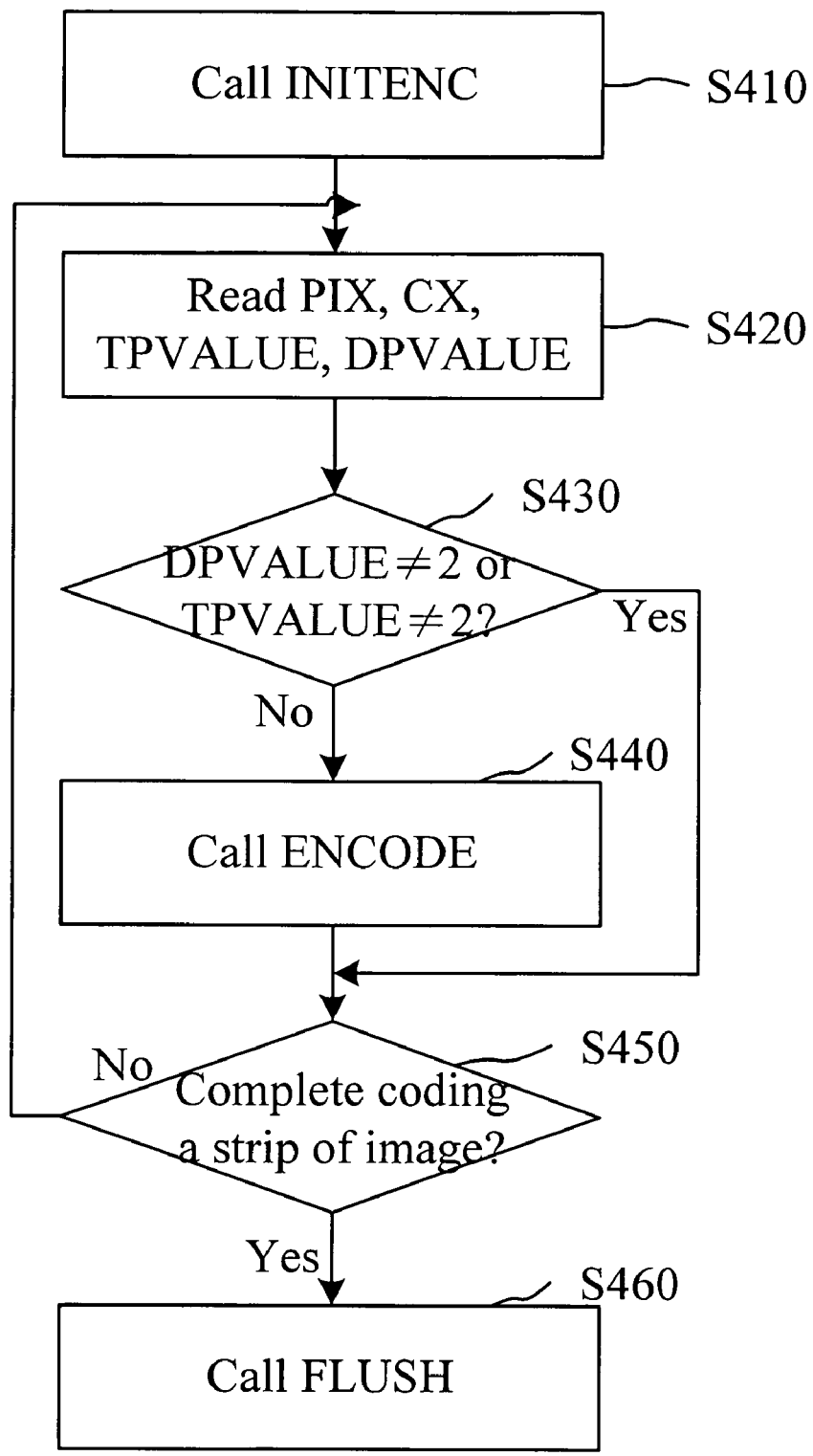
FIG. 4 is a flowchart of a typical JBIG coding.
Figure 5:
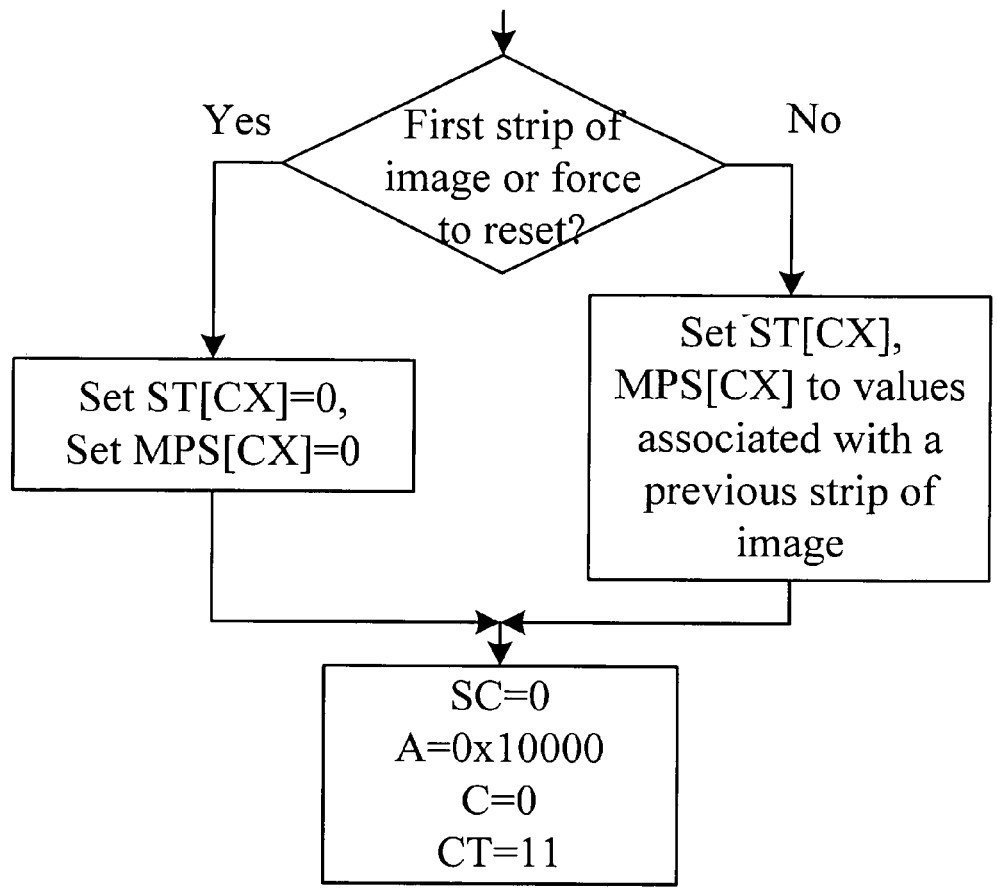
FIG. 5 is a flowchart of the procedure INITENC of FIG. 4.
Figure 6:
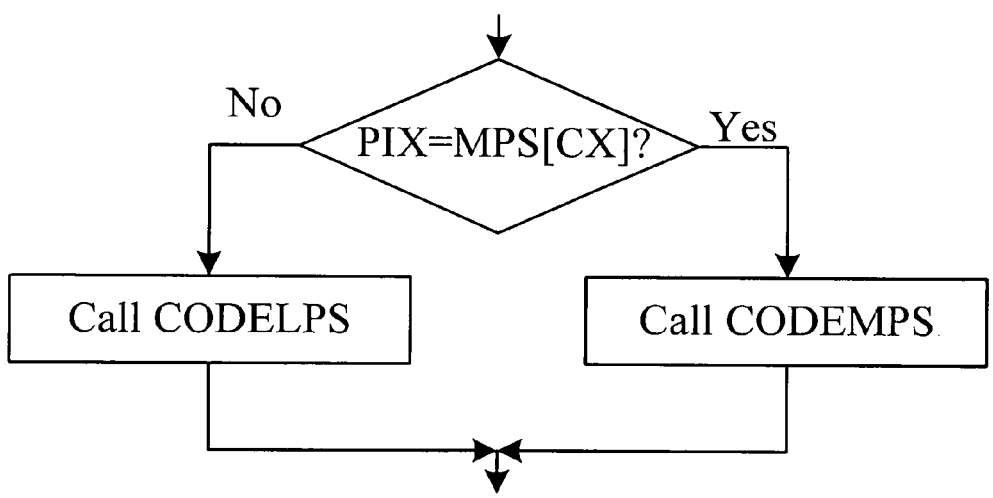
FIG. 6 is a flowchart of the procedure ENCODE of FIG. 4.
Figure 7:
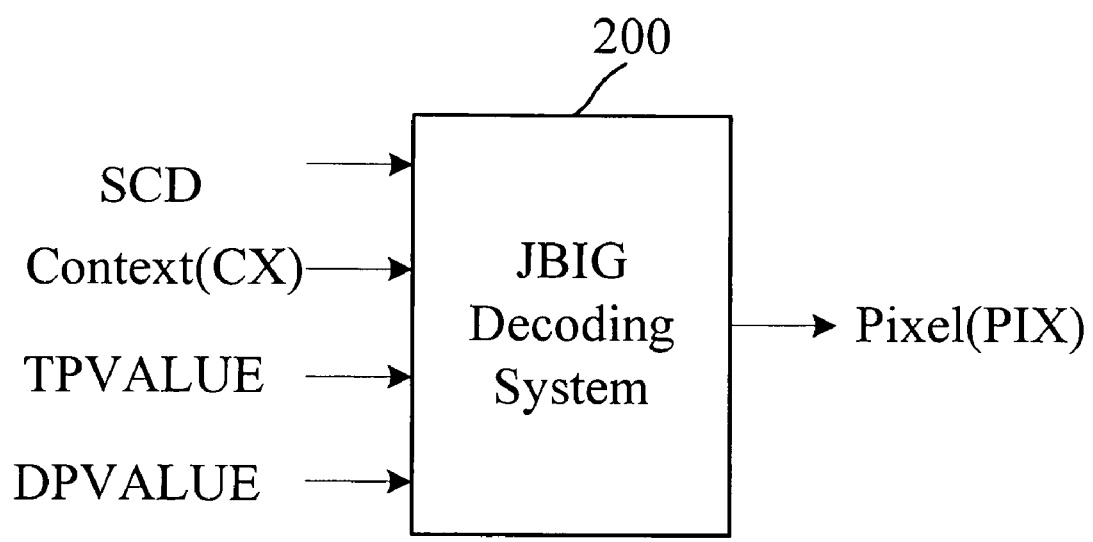
FIG. 7 is a schematic diagram of a typical JBIG decoding system.
Figure 8:
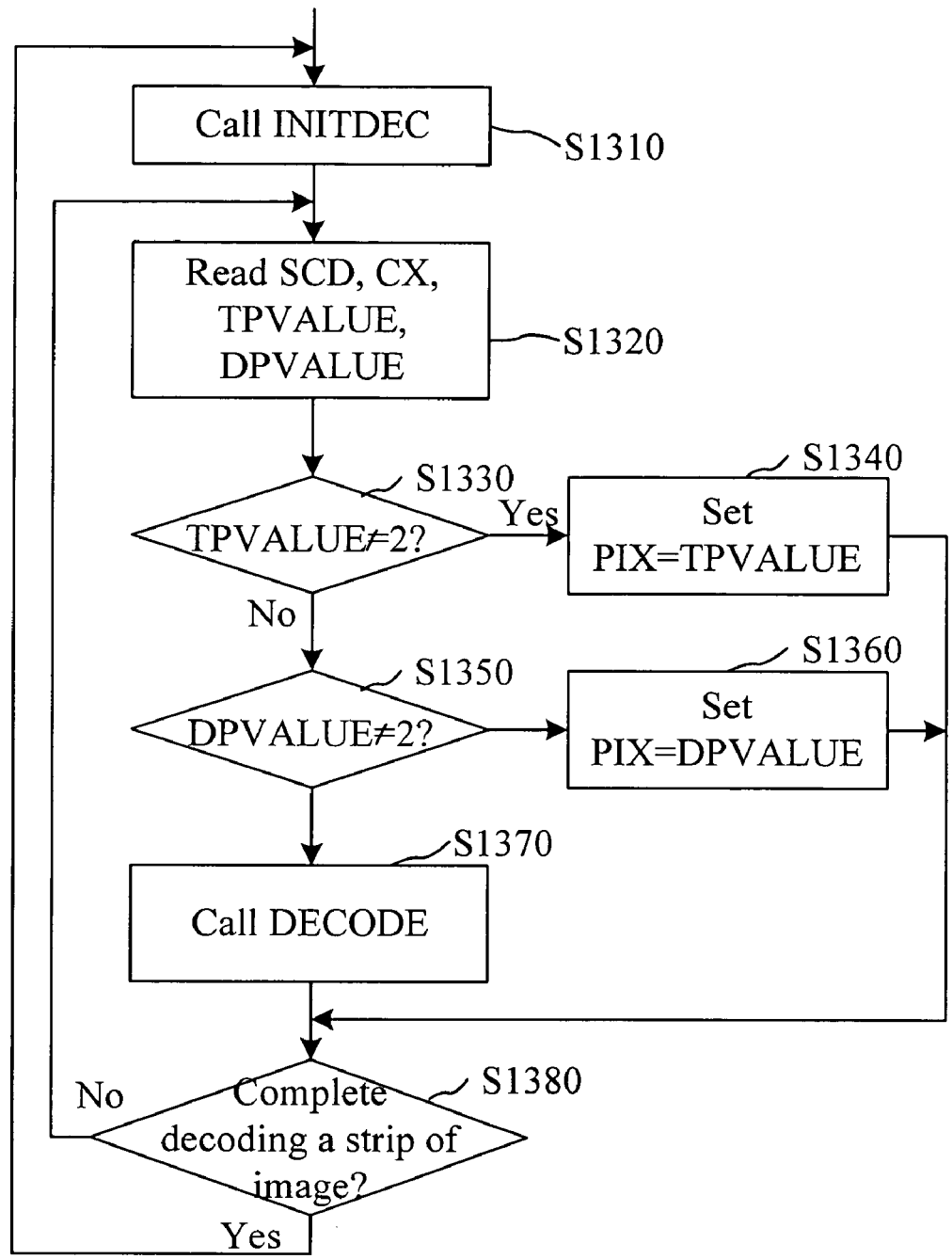
FIG. 8 is a flowchart of a typical JBIG decoding.
Figure 9:
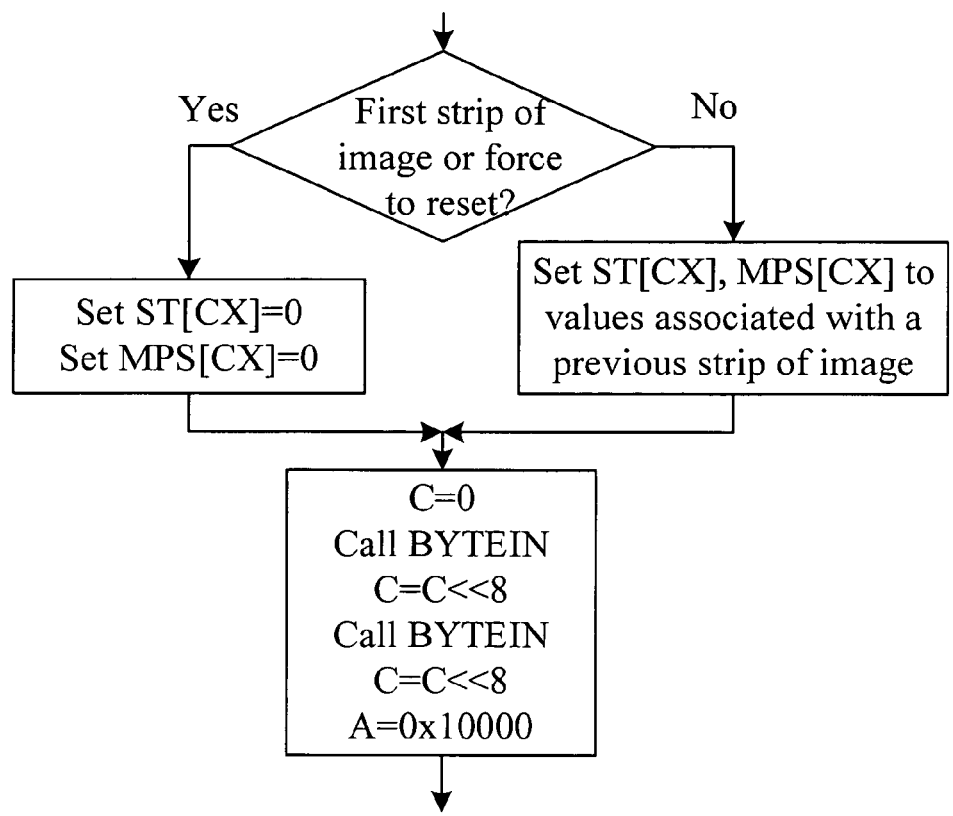
FIG. 9 is a flowchart of the procedure INITDEC of FIG. 8.
Figure 10:
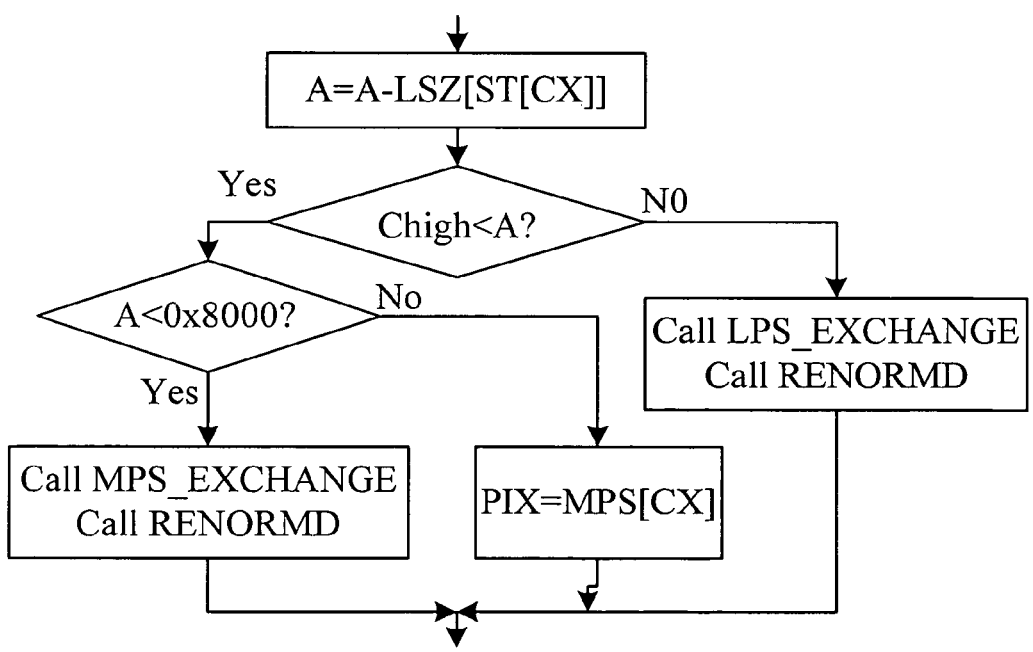
FIG. 10 is a flowchart of the procedure DECODE of FIG. 8.

As cited, those skilled in the hardware description language (HDL) can easily convert the block diagram shown in FIG. 5 into Verilog or VHDL program codes and further produce a circuit diagram of the encoder 1850 by means of synthesis, and thus a detailed description is deemed unnecessary.

Figure 16:
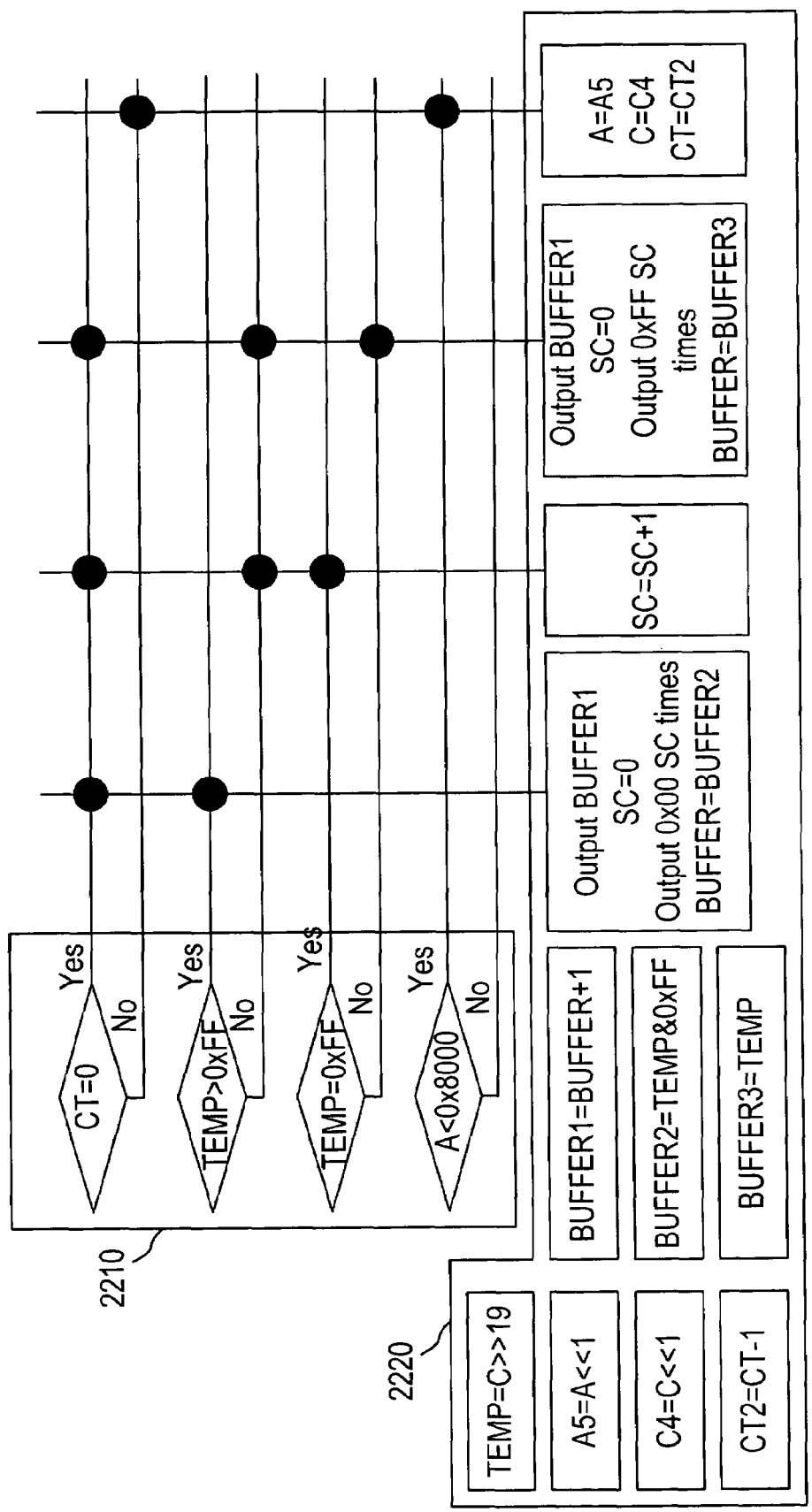
FIG. 16 is a block diagram of an output device in accordance with the invention.

FIG. 16 is a block diagram of the output device 1860 in accordance with the invention. In FIG. 16, the output device 1860 includes a second comparison logic 2210 and a second setting logic 2220. The second setting logic 2220 sets a buffer value BUFFER, a stack counter (SC), the parameter A, the parameter C and the bit counter (CT) based on a comparison result of the second comparison logic 2210.

As shown in FIG. 16, the second comparison logic 2210 compares the bit counter (CT) with zero, a temporary value TEMP with 0xFF, and the parameter A with 0x8000, where TEMP=C>>19 for C to indicate the parameter C and >> to indicate a right shift operation.

When the second comparison logic 2210 performs a comparison and accordingly determines that the bit counter (CT) is equal to zero and the temporary value TEMP is greater than 0xFF, the second setting logic 2220 outputs a first buffer value BUFFER1 and the value, 0x00, SC times and sets the stack counter to zero and the buffer value BUFFER to a second buffer value BUFFER2, where BUFFER1=BUFFER+1, BUFFER indicates the buffer value, BUFFER2=TEMP & 0xFF, SC indicates a value of the stack counter, TEMP indicates the temporary value, and & indicates a bitwise AND operation.

When the bit counter (CT) is equal to zero and the temporary value TEMP is equal to 0xFF, the second setting logic 2220 sets the stack counter to SC+1, where SC indicates a value of the stack counter.

When the bit counter (CT) is equal to zero and the temporary value TEMP is smaller than 0xFF, the second setting logic 2220 outputs the buffer value BUFFER and the value, 0x00, SC times, and sets the buffer value BUFFER to a third buffer value BUFFER3, where SC indicates a value of the stack counter, BUFFER3=TEMP, and TEMP indicates the temporary value.

When the bit counter (CT) is not equal to zero and the parameter A1 is smaller than 0x8000, the second setting logic 2220 outputs the parameter A=A<<1, the parameter C=C<<1 and the bit counter CT=CT−1, where A indicates the parameter A, C indicates the parameter C, CT indicates a value of the bit counter, and << indicates a left shift operation.

Figure 17:
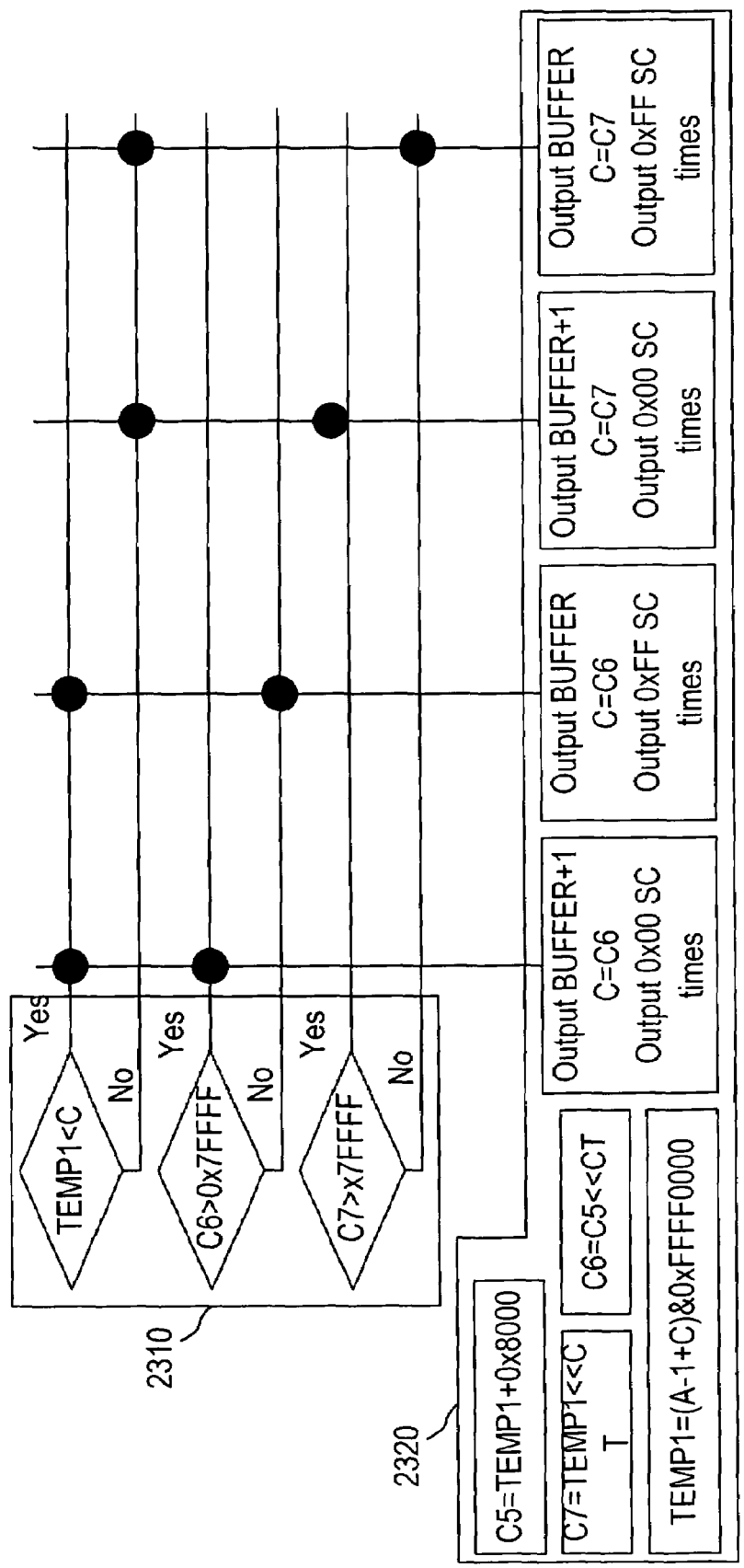
FIG. 17 is a block diagram of an eliminator in accordance with the invention.

FIG. 17 is a block diagram of the eliminator 1880 in accordance with the invention. The eliminator 1880 is connected to the output device 1860 in order to set the parameter C. The eliminator 1880 includes a third comparison logic 2310 and a third setting logic 2320. The third setting logic 2320 sets the parameter C based on a comparison result of the third comparison logic 2310.

As shown in FIG. 17, the third comparison logic 2310 compares a first temporary value TEMP1 with the parameter C, a parameter C6 with 0x7FFFFFF, and a parameter C7 with 0x7FFFFFF, for TEMP1=(A−1+C)& 0x7FFFFFF, where A indicates the parameter A, C indicates the parameter C, C6=(TEMP1+0x80000)<<CT, CT indicate a value of the bit counter, C7=TEMP1<<CT, & indicates a bitwise AND operation, and << indicates a left shift operation.

When the third comparison logic 2310 performs a comparison and accordingly determines that the first temporary value TEMP1 is smaller than the parameter C and the parameter C6 is greater than 0x7FFFFFF, the third setting logic 2320 outputs the first buffer value BUFFER1 and the value, 0x00, SC times and sets the parameter C=(TEMP1+0x80000)<<CT, where TEMP1 indicates the first temporary value, BUFFER1 indicates the first buffer value, SC indicates a value of the stack counter, CT indicates a value of the bit counter, & indicates a bitwise AND operation, and << indicates a left shift operation.

When the first temporary value TEMP1 is smaller than the parameter C and the parameter C6 is not greater than 0x7FFFFFF, the third setting logic 2320 outputs the buffer value BUFFER and the value, 0xFF, SC times and sets the parameter C=(TEMP1+0x080000)<<CT, where TEMP1 indicates the first temporary value, BUFFER indicates the buffer value, SC indicates a value of the stack counter, CT indicates a value of the bit counter, & indicates a bitwise AND operation, and << indicates a left shift operation.

When the first temporary value TEMP1 is not smaller than the parameter C and the parameter C7 is greater than 0x7FFFFFF, the third setting logic 2320 outputs the first buffer value BUFFER1 and the value, 0xFF, SC times and sets the parameter C=TEMP1<<CT, where TEMP1 indicates the first temporary value, BUFFER1 indicates the first buffer value, SC indicates a value of the stack counter, CT indicates a value of the bit counter, & indicates a bitwise AND operation, and << indicates a left shift operation.

When the first temporary value TEMP1 is not smaller than the parameter C and the parameter C7 is not greater than 0x7FFFFFF, the third setting logic 2320 outputs the buffer value BUFFER and the value, 0xFF, SC times and sets the parameter C=TEMP1<<CT, where TEMP1 indicates the first temporary value, BUFFER indicates the buffer value, SC indicates a value of the stack counter, CT indicates a value of the bit counter, & indicates a bitwise AND operation, and << indicates a left shift operation.

Figure 18:
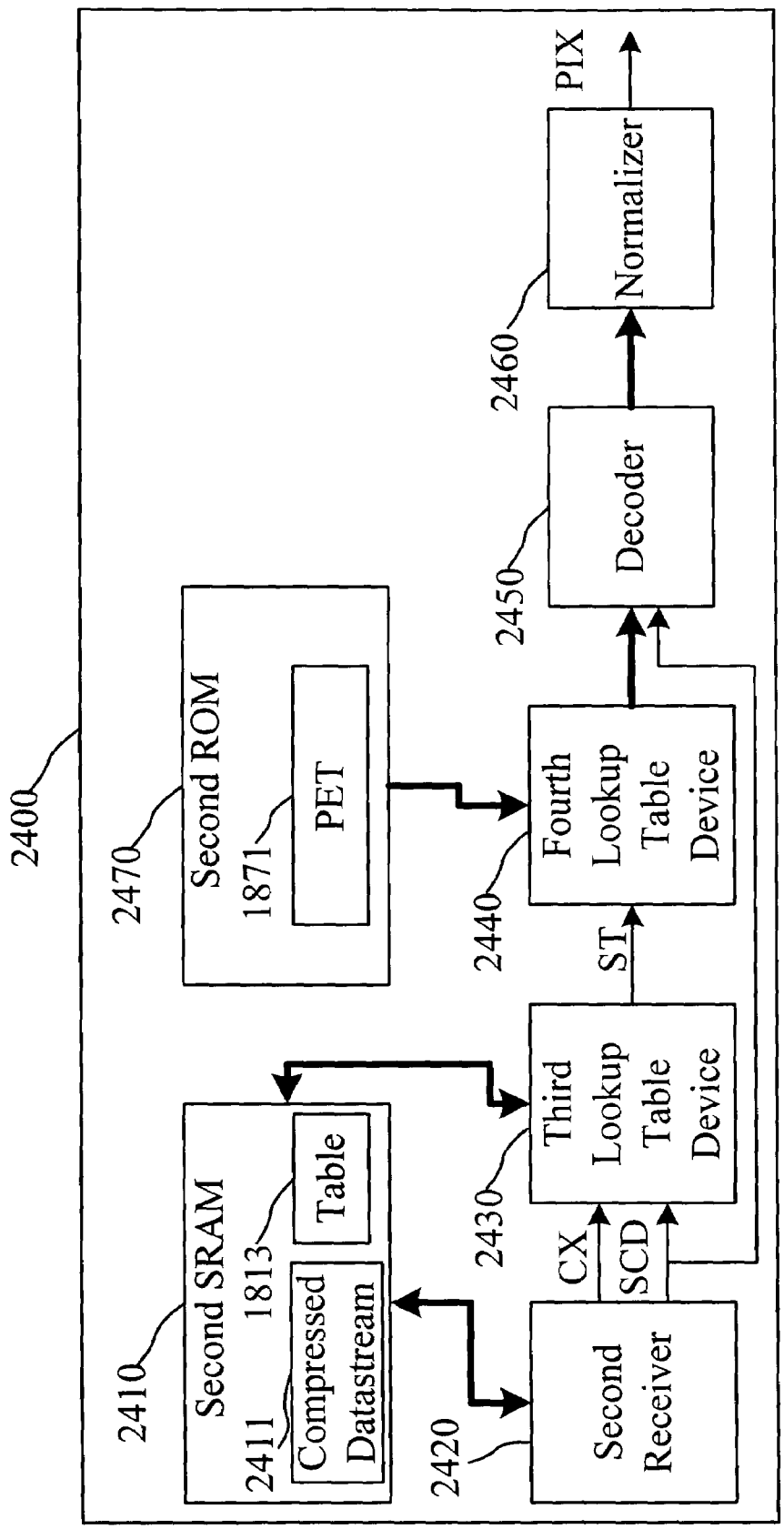
FIG. 18 is a block diagram of a JBIG decoding system in accordance with the invention.

FIG. 18 is a block diagram of a JBIG decoding system 2400 in accordance with the invention. As shown in FIG. 18, the JBIG decoding system 2400 includes a second receiver 2420, a third lookup table device 2430, a fourth lookup table device 2440, a decoder 2450, a normalizer 2460, a second SRAM 2410 and a second ROM 2470.

The second SRAM 2410 stores a compressed datastream 2411 and the table 1813. As shown in FIG. 12, the table 1813 has a plurality of state (ST) fields 18131 and more probable symbol (MPS) fields 18133. Each of the state fields 18131 has seven bits, and each of the MPS fields 18133 has one bit.

The second receiver 2420 receives the compressed datastream 2411. the compressed datastream 2411 contains at least one image compressed data SCD and a context CX corresponding to the image compressed data SCD. The second receiver 2420 extracts a byte of data from the compressed datastream 2411, stores the data as a buffer value BUFFER, and sets the parameter C=C+(BUFFER<<8) and the bit counter to eight, where << indicates a left shift operation.

The third lookup table device 2430 is connected to the second receiver 2420 in order to obtain a state ST and a more probable symbol (MPS) by looking up the table 1813 based on the context CX.

The second ROM 2470 stores the PET 1871 shown in FIG. 13. In this embodiment, the PET 1871 is stored in the second ROM 2470. In other embodiments, the PET 1871 can be stored in the second SRAM 2410.

The fourth lookup table device 2440 is connected to the third lookup table device 2430 in order to obtain a less probable symbol size (LSZ), a next less probable symbol (NPLS), a next more probable symbol (NMPS) and a switch by looking up the PET 1871 based on the state.

The decoder 2450 is connected to the second receiver 2420 and the fourth lookup table device 2440 in order to perform an arithmetic decoding on the image compressed data in accordance with the image compressed data, the LSZ, the NPLS, the NMPS and the switch to accordingly produce a pixel corresponding to the image compressed data and set parameters A and C, where the parameter A indicates an interval between zero and one, and the parameter C indicates a bottom of the interval.

The normalizer 2460 is connected to the decoder 2450 in order to normalize the parameters A and C and output the pixel corresponding to the image compressed data.

Figure 19:
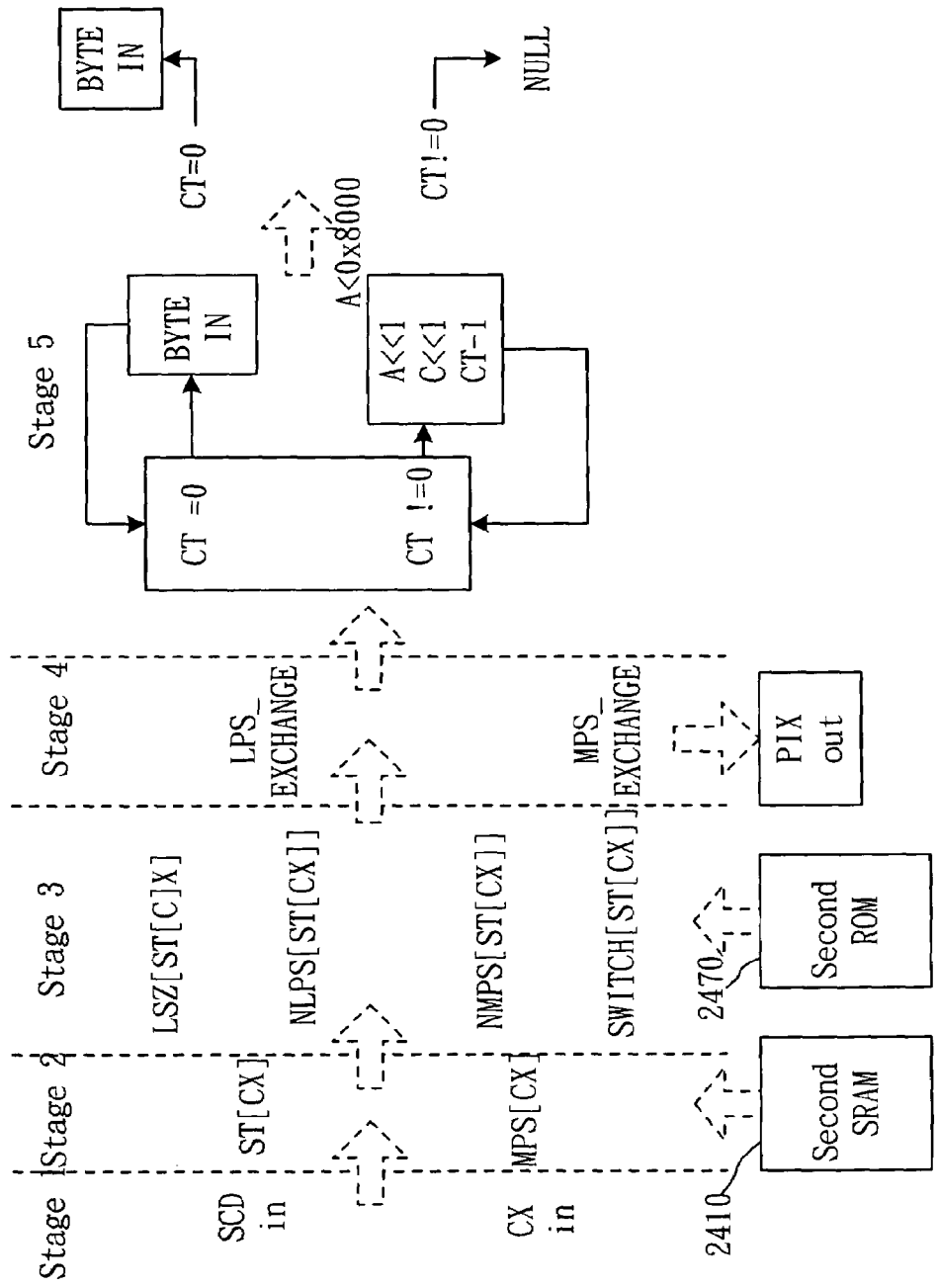
FIG. 19 is a schematic diagram of an operation of the JBIG decoding system of FIG. 18 in accordance with the invention.

FIG. 19 is a schematic diagram of an operation of the JBIG decoding system 2400 of FIG. 18 in accordance with the invention. As shown in FIG. 19, the hardware of the JBIG decoding system 2400 uses a pipeline operation to perform the JBIG decoding to thereby increase the decoding speed. In this case, Stage 1 corresponds to the operation of the second receiver 2420, Stage 2 corresponds to the operation of the third lookup table device 2430, Stage 3 corresponds to the operation of the fourth lookup table device 2440, Stage 4 corresponds to the operation of the decoder 2450, and Stage 5 corresponds to the operation of the normalizer 2460.

Figure 20:
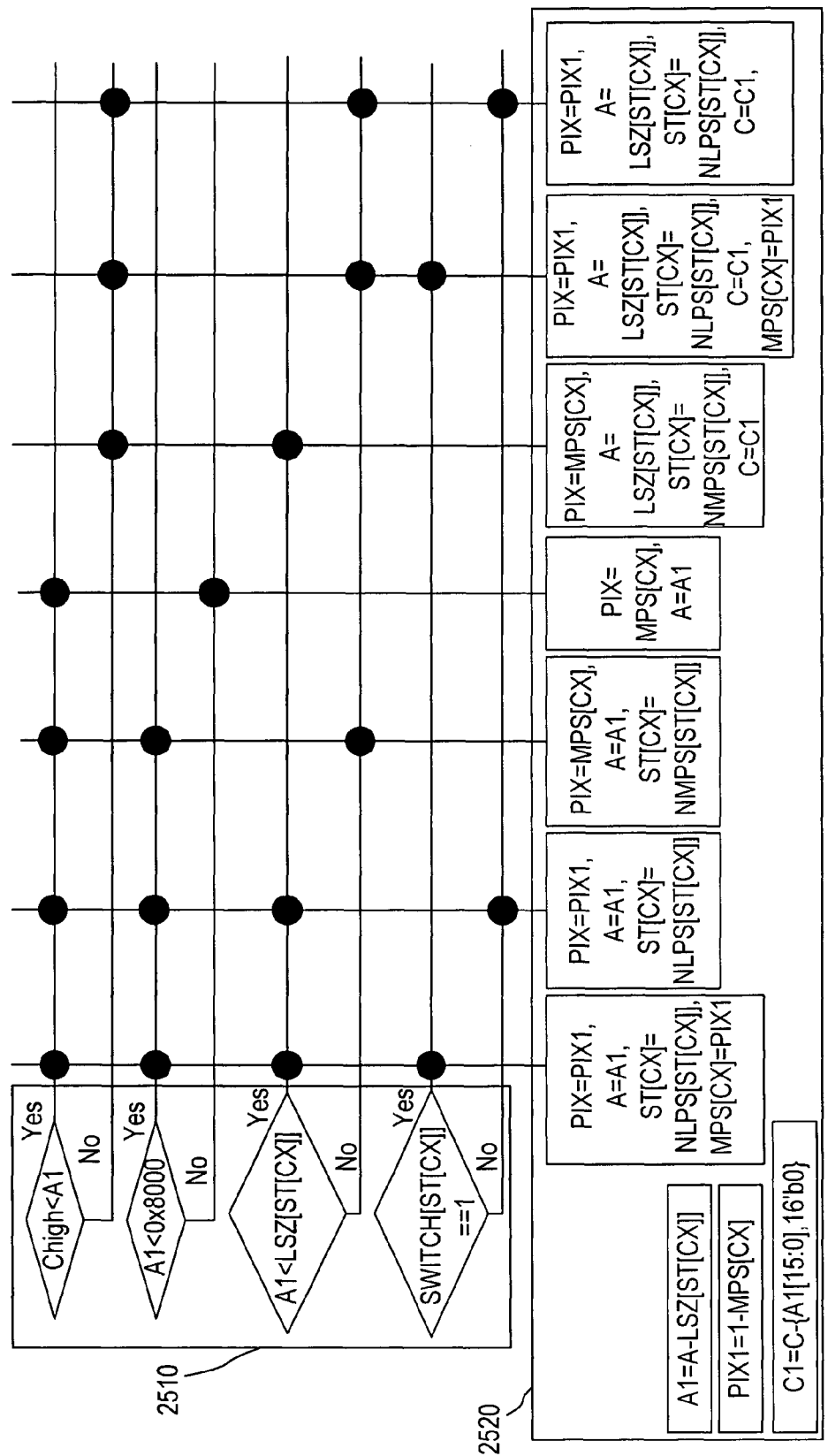
FIG. 20 is a block diagram of a decoder in accordance with the invention.

FIG. 20 is a block diagram of the decoder 2450 in accordance with the invention. In FIG. 20, the decoder 2450 includes a fourth comparison logic 2510 and a fourth setting logic 2520. As shown in FIG. 20, the fourth setting logic 2520 sets the parameters A, C, and a bit counter in accordance with a result of the fourth comparison logic 2510, and updates the state fields and MPS fields of the table 1813.

The fourth comparison logic 2510 compares the high word Chigh of the parameter C with a parameter A1, the parameter A1 with 0x8000 and LSZ[ST[CX]], and the switch with one, where Chigh indicates $31^{st}$ to $16^{th}$ bits of the parameter C, A1=A-LSZ[ST[CX]], A indicates the parameter A, LSZ indicates the less probable symbol size, ST indicates the state, and CX indicates the context.

When the high word Chigh of the parameter C is smaller than the parameter A1, the parameter A1 is smaller than 0x8000 and LSZ[ST[CX]], and the switch is equal to one, the fourth setting logic 2520 sets an output decompressed pixel to (1−MPS[CX]) and the parameter A=(A-LSZ[ST[CX]]), and updates the state and MPS fields of the table 1813 as ST[CX]=NLPS[ST[CX]] and MPS[CX]=(1−MPS[CX]), where A indicates the parameter A, C indicates the parameter C, CX indicates the context, ST indicates the state, NLPS indicates the next less probable symbol, MPS indicates the more probable symbol, and CT indicates a value of the bit counter.

When the high word Chigh of the parameter C is smaller than the parameter A1, the parameter A1 is smaller than 0x8000 and LSZ[ST[CX]], and the switch is not equal to one, the fourth setting logic 2520 sets an output decompressed pixel to (1−MPS[CX]) and the parameter A=(A-LSZ[ST[CX]]), and updates the state field of the table 1813 as ST[CX]=NLPS[ST[CX]], where A indicates the parameter A, C indicates the parameter C, CX indicates the context, ST indicates the state, NLPS indicates the next less probable symbol, MPS indicates the more probable symbol, and CT indicates a value of the bit counter.

When the high word Chigh of the parameter C is smaller than the parameter A1 and the parameter A1 is smaller than 0x8000 but not smaller than LSZ[ST[CX]], the fourth setting logic 2520 sets an output decompressed pixel to MPS[CX] and the parameter A=(A-LSZ[ST[CX]]), and updates the state field of the table 1813 as ST[CX]=NMPS[ST[CX]], where A indicates the parameter A, C indicates the parameter C, CX indicates the context, ST indicates the state, NMPS indicates the next more probable symbol, MPS indicates the more probable symbol, and CT indicates a value of the bit counter.

When the high word Chigh of the parameter C is smaller than the parameter A1 and the parameter A1 is not smaller than 0x8000, the fourth setting logic 2520 sets an output decompressed pixel to MPS[CX] and the parameter A=(A-LSZ[ST[CX]]), where A indicates the parameter A, CX indicates the context, ST indicates the state, MPS indicates the more probable symbol, and CT indicates a value of the bit counter.

When the high word Chigh of the parameter C is not smaller than the parameter A1 and the parameter A1 is smaller than LSZ[ST[CX]], the fourth setting logic 2520 sets an output decompressed pixel to MPS[CX], the parameter A=LSZ[ST[CX]] and the parameter C=C−{A1[15:00], 16'b0}, and updates the state field of the table 1813 as ST[CX]=NMPS[ST[CX]], where A indicates the parameter A, C indicates the parameter C, CX indicates the context, ST indicates the state, NMPS indicates the next more probable symbol, MPS indicates the more probable symbol, and { } indicates a concatenation operation. The concatenation operation concatenates two datastreams to form a new data. For example, B={A1[15:00],16'b0} indicates that the $15^{th}$ to $0^{th}$ bits of parameter B are zero, and the $31^{st}$ to $16^{th}$ bits have the values equal to the $15^{th}$ to $0^{th}$ bits of the parameter A1, respectively.

When the high word Chigh of the parameter C is not smaller than the parameter A1, the parameter A1 is not smaller than LSZ[ST[CX]] and the switch is equal to one, the fourth setting logic 2520 sets an output decompressed pixel to (1−MPS[CX]), the parameter A=LSZ[ST[CX]] and the parameter C=C−{A1[15:00], 16'b0}, and updates the state and MPS fields of the table 1813 as ST[CX]=NLPS[ST[CX]] and MPS[CX]=(1−MPS[CX]), where A indicates the parameter A, C indicates the parameter C, CX indicates the context, ST indicates the state, NLPS indicates the next less probable symbol, MPS indicates the more probable symbol, and { } indicates a concatenation operation.

When the high word Chigh of the parameter C is not smaller than the parameter A1, the parameter A1 is not smaller than LSZ[ST[CX]] and the switch is not equal to one, the fourth setting logic 2520 sets an output decompressed pixel to (1−MPS[CX]), the parameter A=LSZ[ST[CX]] and the parameter C=C−{A1[15:00], 16'b0}, and updates the state field of the table 1813 as ST[CX]=NLPS[ST[CX]], where A indicates the parameter A, C indicates the parameter C, CX indicates the context, ST indicates the state, NLPS indicates the next less probable symbol, MPS indicates the more probable symbol, and { } indicates a concatenation operation.

Figure 21:
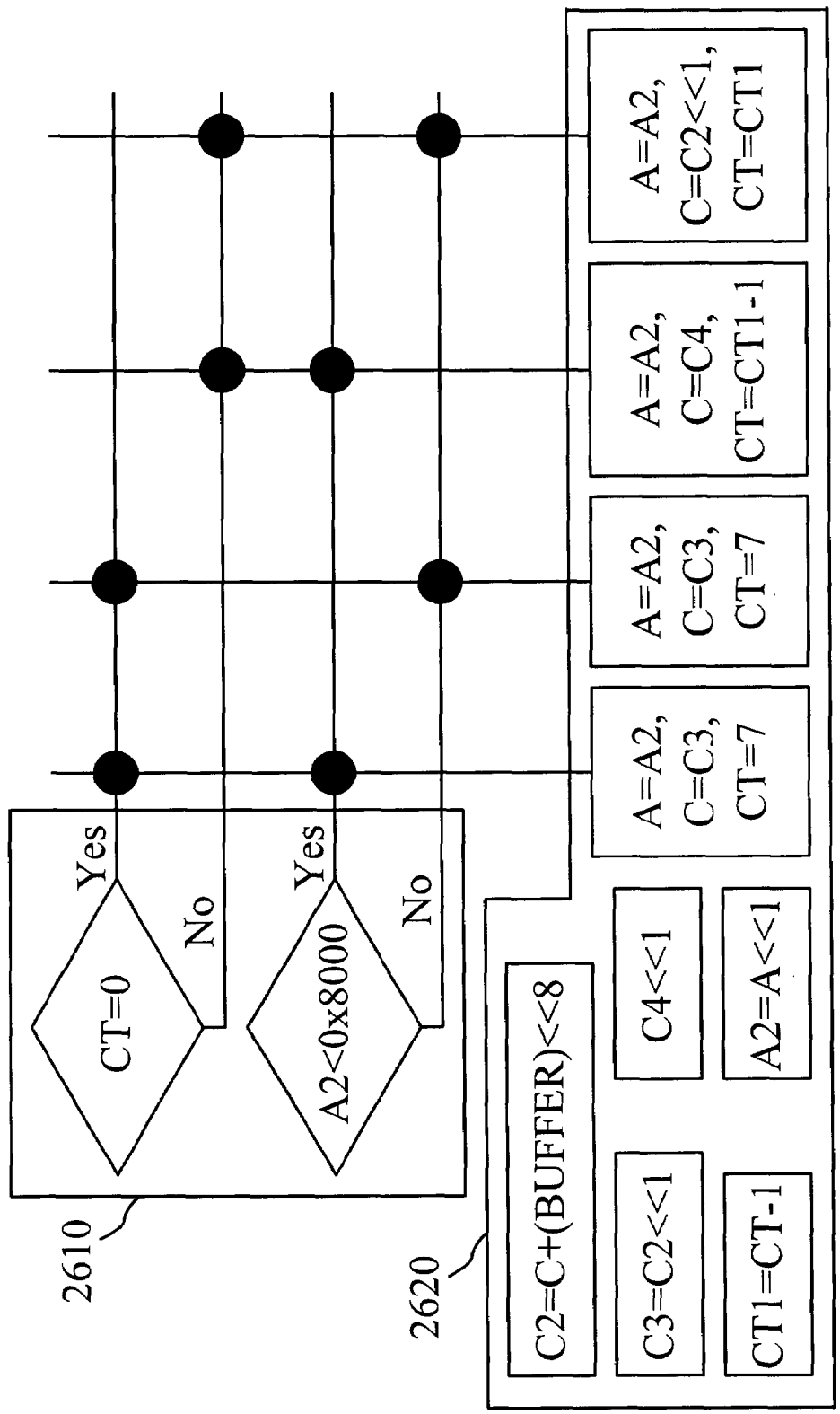
FIG. 21 is a block diagram of a normalizer in accordance with the invention.

FIG. 21 is a block diagram of the normalizer 2460 in accordance with the invention. In FIG. 21, the normalizer 2460 includes a fifth comparison logic 2610 and a fifth setting logic 2620. The fifth setting logic 2620 sets the parameters A, C, and the bit counter in accordance with a comparison result of the fifth comparison logic 2610.

As shown in FIG. 21, the fifth comparison logic compares the bit counter (CT) with zero and a parameter A2 with 0x8000, where the parameter A2=A<<1 for A to indicate the parameter A and << to indicate a left shift operation.

When the bit counter (CT) is equal to zero and the parameter A2 is smaller than 0x8000, the fifth setting logic 2620 sets the parameter A=A2, the parameter C=C2<<1 and the bit counter CT=7, where C2=C+(BUFFER<<8) and BUFFER indicates the buffer value.

When the bit counter (CT) is equal to zero and the parameter A2 is not smaller than 0x8000, the fifth setting logic 2620 sets the parameter A=A2, the parameter C=C2<<1 and the bit counter CT=7, where C2=C+(BUFFER<<8) and BUFFER indicates the buffer value.

When the bit counter (CT) is not equal to zero and the parameter A2 is smaller than 0x8000, the fifth setting logic 2620 sets the parameter A=A2, the parameter C=C<<1=C4 and the bit counter CT=CT−1.

When the bit counter (CT) is not equal to zero and the parameter A2 is not smaller than 0x8000, the fifth setting logic 2620 sets the parameter A=A2, the parameter C=C2<<1 and the bit counter CT=CT−1.

In view of foregoing, it is known that the invention provides a series of complete serial and parallel computational combinations in arithmetic coding and decoding to thereby reduce the complexity of JBIG arithmetic encoder and decoder and increase the processing speed. The invention can simplify the processing steps of the JBIG arithmetic encoder and decoder and reduce the required time to thereby relatively increase the entire output efficiency.

Although the present invention has been explained in relation to its preferred embodiment, it is to be understood that many other possible modifications and variations can be made without departing from the spirit and scope of the invention as hereinafter claimed.

What is claimed is:

1. A Joint Bi-level Image Group (JBIG) coding system, comprising:
a first receiver, which receives a datastream that contains at least one pixel and a context corresponding to the pixel;
a first lookup table device, which is connected to the first receiver in order to obtain a state and a more probable symbol by looking up a table in accordance with the context;
a first static random access memory, which is connected to the first receiver and the first lookup table device in order to store the datastream and the table with a plurality of state fields and more probable symbol field for the first lookup table device to accordingly obtain the state and the more probable symbol by looking up the table in accordance with the context;
a second lookup table device, which is connected to the first lookup table device in order to obtain a less probable symbol size, a next less probable symbol, a next more probable symbol and a switch by looking up a probability estimation table in accordance with the state;
an encoder, which is connected to the first receiver and the second lookup table device in order to perform an arithmetic coding on the pixel in accordance with the pixel, the less probable symbol size, the next less probable symbol, the next more probable symbol and the switch to accordingly produce a compressed data corresponding to the pixel and set parameters A and C, where the parameter A indicates an interval between zero and one and the parameter C indicates a bottom of the interval; and
an output device, which is connected to the encoder in order to normalize the parameters A and C and output the compressed data corresponding to the pixel.

2. The coding system as claimed in claim 1, wherein the encoder comprises a first comparison logic and a first setting logic, and the first setting logic is based on a comparison result of the first comparison logic to set the parameter A, the parameter C and a bit counter, and to update the state and more probable symbol fields of the table.

3. The coding system as claimed in claim 2, wherein the first comparison logic compares the pixel with the more probable symbol, the first comparison logic compares a parameter A1 with a special value, 0x8000, the first comparison logic compares the parameter A1 with the less probable symbol size, and the first comparison logic compares the switch with one to thereby determine if the switch is equal to one, where A1=(A-LSZ[ST[CX]]) for A to indicate the parameter A, LSZ to indicate the less probable symbol size, ST to indicate the state and CX to indicate the context.

4. The coding system as claimed in claim 3, wherein, when the pixel is equal to the more probable symbol, and the parameter A1 is smaller than 0x8000 and the less probable symbol size, the first setting logic sets the parameter C=(C+A1) <<1, the parameter A=LSZ[ST[CX]]<<1 and the bit counter CT=CT−1, and updates the state field of the table as ST[CX]=NMPS[ST[CX]], where LSZ ndicates the less probable symbol size, << indicates a left shift operation, CX indicates the context, ST indicates the state, NMPS indicates the next more probable symbol, and CT indicates a value of the bit counter.

5. The coding system as claimed in claim 3, wherein, when the pixel is equal to the more probable symbol, and the parameter A1 is smaller than 0x8000 but not smaller than the less probable symbol size, the first setting logic sets the parameter C=C<<1, the parameter A=(A-LSZ[ST[CX]])<<1 and the bit counter CT=CT−1, and updates the state field of the table as ST[CX]=NMPS[ST[CX]], where LSZ indicates the less probable symbol size, << indicates a left shift operation, CX indicates the context, ST indicates the state, NMPS indicates the next more probable symbol, and CT indicates a value of the bit counter.

6. The coding system as claimed in claim 3, wherein, when the pixel is equal to the more probable symbol, and the parameter A1 is not smaller than 0x8000, the first setting logic sets the parameter A=A1<<1, where A indicates the parameter A and << indicates a left shift operation.

7. The coding system as claimed in claim 3, wherein, when the pixel is not equal to the more probable symbol, the parameter A1 is smaller than the less probable symbol size, and the switch is equal to one, the first setting logic sets the parameter C=C<<1, the parameter A=(A-LSZ[ST[CX]])<<1 and the bit counter CT=CT−1, and updates the state field of the table as ST[CX]=NMPS[ST[CX]] and the more probable symbol field of the table as MPS[CX]=(1−MPS[CX]), where LSZ indicates the less probable symbol size, << indicates a left shift operation, CX indicates the context, ST indicates the state, NMPS indicates the next more probable symbol, MPS indicates the more probable symbol, and CT indicates a value of the bit counter.

8. The coding system as claimed in claim 3, wherein, when the pixel is not equal to the more probable symbol, the parameter A1 is smaller than the less probable symbol size, and the switch is not equal to one, the first setting logic sets the parameter C=C<<1, the parameter A=(A-LSZ[ST[CX]])<<1 and the bit counter CT=CT−1, and updates the state field of the table as ST[CX]=NLPS[ST[CX]], where LSZ indicates the less probable symbol size, << indicates a left shift operation, CX indicates the context, ST indicates the state, NLPS indicates the next less probable symbol, and CT indicates a value of the bit counter.

9. The coding system as claimed in claim 3, wherein, when the pixel is not equal to the more probable symbol, the parameter A1 is not smallerthan the less probable symbol size, and the switch is equal to one, the first setting logic sets the parameter C=(C+A1)<<1, the parameter A=(LSZ[ST[CX]]) <<1 and the bit counter CT=CT−1, and updates the state field of the table as ST[CX]=NLPS[ST[CX]] and the more probable symbol field of the table as MPS[CX]=(1−MPS[CX]), where LSZ indicates the less probable symbol size, << indicates a left shift operation, CX indicates the context, ST indicates the state, NLPS indicates the next less probable symbol, MPS indicates the more probable symbol, and CT indicates a value of the bit counter.

10. The coding system as claimed in claim 3, wherein, when the pixel is not equal to the more probable symbol, the parameter A1 is not smaller than the less probable symbol size, and the switch is not equal to one, the first setting logic sets the parameter C=(C+A1)<<1, the parameter A=(LSZ[ST[CX]]) <<1 and the bit counter CT=CT−1 , and updates the state field of the table as ST[CX]=NLPS[ST[CX]], where LSZ indicates the less probable symbol size, << indicates a left shift operation, CX indicates the context, ST indicates the state, NLPS indicates the next less probable symbol, and CT indicates a value of the bit counter.

11. The coding system as claimed in claim 3, wherein the output device comprises a second comparison logic and a second setting logic, and the second setting logic is based on a comparison result of the second comparison logic to set a buffer value, a stack counter, the parameter A, the parameter C and the bit counter.

12. The coding system as claimed in claim 11, wherein the second comparison logic compares the bit counter with zero to thereby determine if the bit counter is equal to zero, the second comparison logic compares a temporary value TEMP with 0xFF to thereby determine if the temporary value is greater than 0xFF, the second comparison logic determines if the temporary value is equal to 0xFF, and the second comparison logic compares the parameter A with 0x8000 to thereby determines if the parameter A is smaller than 0x8000, where TEMP=C>>19 for C to indicate the parameter C and >> to indicate a right shift operation.

13. The coding system as claimed in claim 12, wherein, when the second comparison logic compares and determines that the bit counter is equal to zero and the temporary value is greater than 0xFF, the second setting logic outputs a first buffer value and a value, 0x00, SC times and sets the stack counter to zero and the buffer value to a second buffer value, where BUFFER1=BUFFER+1, BUFFER2=TEMP & 0xFF, SC indicates a value of the stack counter, BUFFER1 indicates the first buffer value, BUFFER indicates the buffer value, BUFFER2 indicates the second buffer value, TEMP indicates the temporary value, and & indicates a bitwise AND operation.

14. The coding system as claimed in claim 12, wherein, when the bit counter is equal to zero and the temporary value is equal to 0xFF, the second setting logic sets the stack counter to SC+1, where SC indicates a value of the stack counter.

15. The coding system as claimed in claim 12, wherein, when the bit counter is equal to zero and the temporary value is not greater than and equal to 0xFF, the second setting logic outputs the buffer value and a value, 0x00, SC times and sets the buffer value to a third buffer value, where BUFFER3=TEMP, SC indicates a value of the stack counter, BUFFER3 indicates the third buffer value, and TEMP indicates the temporary value.

16. The coding system as claimed in claim 12, wherein, when the bit counter is not equal to zero and the parameter A1 is smaller than 0x8000, the second setting logic outputs the parameter A=A <<1, the parameter C=C <<1 and the bit counter CT=CT−1, where CT indicates a value of the bit counter and << indicates a left shift operation.

17. The coding system as claimed in claim 12, further comprises an eliminator, which is connected to the output device in order to set the parameter C and has a third comparison logic and a third setting logic, wherein the third setting logic sets the parameter C in accordance with a comparison result of the third comparison logic.

18. The coding system as claimed in claim 17, wherein the third comparison logic compares a first temporary value with a second parameter to thereby determine if the first temporary value is smaller than the second parameter, the third comparison logic compares and determines if a parameter C6 is greater than 0x7FFFFFF, and the third comparison logic compares and determines if a parameter C7 is greater than 0x7FFFFFF, where TEMP1=(A−1+C)&0xFFF0000 and A2=A<<1 for TEMP1 to indicate the first temporary value, A to indicate the parameter A, C to indicate the parameter C, & to indicate a bitwise AND operation, A2 to indicate the second parameter, C6=(TEMP1+0x80000)<< CT for TEMP1 to indicate the first temporary value, CT to indicate a value of the bit counter, << to indicate a left shift operation, C7=TEMP1<< CT for TEMP1 to indicate the first temporary value, CT to indicate a value of the bit counter and << to indicate a left shift operation.

19. The coding system as claimed in claim 18, wherein, when the first temporary value is smaller than the parameter C and the parameter C6 is greater than 0x7FFFFFF, the third setting logic outputs a first buffer value BUFFER1 and a value, 0x00, SC times and sets the parameter C=(TEMP1+ 0x80000)<<CT, where SC indicates a value of the stack counter, TEMP1 indicates the first temporary value, CT indicates a value of the bit counter, and << indicates a left shift operation.

20. The coding system as claimed in claim 18, wherein, when the first temporary value is smaller than the parameter C and the parameter C6 is not greater than 0x7FFFFFF, the third setting logic outputs the buffer value BUFFER and a value, 0xFF, SC times and sets the parameter C=(TEMP1+0x80000) <<CT, where TEMP1 indicates the first temporary value, SC indicates a value of the stack counter, CT indicates a value of the bit counter, and << indicates a left shift operation.

21. The coding system as claimed in claim 18, wherein, when the first temporary value is not smaller than the parameter C and the parameter C7 is greater than 0x7FFFFFF, the third setting logic outputs a first buffer value BUFFER1 and a value, 0x00, SC times and sets the parameter C=TEMP1<<CT, where TEMP1 indicates the first temporary value, SC indicates a value of the stack counter, CT indicates a value of the bit counter, and <<indicates a left shift operation.

22. The coding system as claimed in claim 18, wherein, when the first temporary value is not smaller than the parameter C and the parameter C7 is not greater than 0x7FFFFFF, the third setting logic outputs the buffer value BUFFER and a value, 0xFF, SC times and sets the parameter C=TEMP1<<CT, where TEMP1 indicates the first temporary value, SC indicates a value of the stack counter, CT indicates a value of the bit counter, and << indicates a left shift operation.

23. A Joint Bi-level Image Group (JBIG) decoding system, comprising:
  a second receiver, which receives a compressed datastream that contains at least one image compressed data and a context corresponding to the image compressed data;
  a third lookup table device, which is connected to the second receiver in order to obtain a state and a more probable symbol by looking up a table in accordance with the context;
  a second static random access memory, which is connected to the second receiver and the third lookup table device in order to store the compressed datastream and the table with a plurality of state and more probable symbol fields for the third lookup table device to accordingly obtain the state and the more probable symbol by looking up the table in accordance with the context;
  a fourth lookup table device, which is connected to the third lookup table device in order to obtain a less probable symbol size, a next less probable symbol, a next more probable symbol and a switch by looking up a probability estimation table in accordance with the state;
  a decoder, which is connected to the second receiver and the fourth lookup table device in order to perform an arithmetic decoding on the image compressed data in accordance with the image compressed data, the less probable symbol size, the next less probable symbol, the next more probable symbol and the switch to accordingly produce a pixel corresponding to the image compressed data and set parameters A and C, where the parameter A indicates an interval between zero and one and the parameter C indicates a bottom of the interval; and a normalizer, which is connected to the decoder in order to normalize the parameters A and C and output the pixel corresponding to the image compressed data.

24. The decoding system as claimed in claim 23, wherein the second receiver extracts a byte of data from the compressed datastream, stores the data as a buffer value BUFFER, and sets the parameter C=C+(BUFFER <<8) and a bit counter to eight, where << indicates a left shift operation.

25. The decoding system as claimed in claim 24, wherein the decoder comprises a fourth comparison logic and a fourth setting logic, and the fourth setting logic is based on a comparison result of the fourth comparison logic to set the parameter A, the parameter C and the bit counter, and to update the state and more probable symbol fields of the table.

26. The decoding system as claimed in claim 25, wherein the fourth comparison logic compares a high word of the parameter C and a parameter A1, the fourth comparison logic compares the parameter A1 with 0x8000, the fourth comparison logic compares the parameter A1 with LSZ[ST[CX]], and the fourth comparison logic compares the switch with one to thereby determine if the switch is equal to one, where the high word indicates $31^{st}$ to $16^{th}$ bits of the parameter C and A1=A-LSZ[ST[CX]] for A to indicate the parameter A, LSZ to indicate the less probable symbol size, ST to indicate the state and CX to indicate the context, A1=A-LSZ[ST[CX]] for A to indicate the parameter A, LSZ to indicate the less probable symbol size, ST to indicate the state and CX to indicate the context.

27. The decoding system as claimed in claim 26, wherein, when the high word of the parameter C is smaller than the parameter A1, the parameter A1 is smaller than 0x8000 and LSZ[ST[CX]], and the switch is equal to one, the fourth setting logic sets an output decompressed pixel to (1-MPS[CX]) and the parameter A=(A-LSZ[ST[CX]]), and updates the state and more probable symbol fields of the table as ST[CX]=NLPS[ST[CX]] and MPS[CX]=(1-MPS[CX]), where CX indicates the context, ST indicates the state, NLPS indicates the next less probable symbol, MPS indicates the more probable symbol, and CT indicates a value of the bit counter.

28. The decoding system as claimed in claim 26, wherein, when the high word of the parameter C is smaller than the parameter A1, the parameter A1 is smaller than 0x8000 and LSZ[ST[CX]], and the switch is not equal to one, the fourth setting logic sets an output decompressed pixel to (1-MPS [CX]) and the parameter A=(A-LSZ[ST[CX]]), and updates the state field of the table as ST[CX]=NLPS[ST[CX]], where CX indicates the context, ST indicates the state, NLPS indicates the next less probable symbol, MPS indicates the more probable symbol, and CT indicates a value of the bit counter.

29. The decoding system as claimed in claim 26, wherein, when the high word of the parameter C is smaller than the parameter A1 and the parameter A1 is smaller than 0x8000 but not smaller than LSZ[ST[CX]], the fourth setting logic sets an output decompressed pixel to MPS[CX] and the parameter A=(A-LSZ[ST[CX]]), and updates the state field of the table as ST[CX]=NMPS[ST[CX]], where CX indicates the context, ST indicates the state, MPS indicates the more probable symbol, NMPS indicates the next more probable symbol, and CT indicates a value of the bit counter.

30. The decoding system as claimed in claim 26, wherein, when the high word of the parameter C is smaller than the parameter A1 and the parameter A1 is not smaller than 0x8000, the fourth setting logic sets an output decompressed pixel to MPS[CX] and the parameter A=(A-LSZ[ST[CX]]), where CX indicates the context, ST indicates the state, MPS indicates the more probable symbol, and CT indicates a value of the bit counter.

31. The decoding system as claimed in claim 26, wherein, when the high word of the parameter C is not smaller than the parameter A1 and the parameter A1 is smaller than LSZ[ST[CX]], the fourth setting logic sets an output decompressed pixel to MPS[CX], the parameter A=LSZ[ST[CX]] and the parameter C=C-{A1 [15:00], 16'bo}, and updates the state field of the table as ST[CX]=NMPS[ST[CX]], where CX indicates the context, ST indicates the state, NMPS indicates the next more probable symbol, MPS indicates the more probable symbol, and {} indicates a concatenation operation.

32. The decoding system as claimed in claim 26, wherein, when the high word of the parameter C is not smaller than the parameter A1, the parameter A1 is not smaller than LSZ[ST[CX]], and the switch is equal to one, the fourth setting logic sets an output decompressed pixel to (1-MPS[CX]), the parameter A=LSZ[ST[CX]] and the parameter C=C-{A1[15:00], 16'bo}, and updates the state and more probable symbol fields of the table as ST[CX]=NLPS[ST[CX]] and MPS[CX]= (1-MPS[CX]), where CX indicates the context, ST indicates the state, NLPS indicates the next less probable symbol, MPS indicates the more probable symbol, and {} indicates a concatenation operation.

33. The decoding system as claimed in claim 26, wherein, when the high word of the parameter C is not smaller than the parameter A1, the parameter A1 is not smaller than LSZ[ST[CX]], and the switch is not equal to one, the fourth setting logic sets an output decompressed pixel to (1-MPS [CX]), the parameter A=LSZ[ST[CX]] and the parameter C=C-{A1 [15:00], 16'bo}, and updates the state field of the table as ST[CX]= NLPS[ST[CX]], where CX indicates the context, ST indicates the state, NLPS indicates the next less probable symbol, MPS indicates the more probable symbol, and {} indicates a concatenation operation.

34. The decoding system as claimed in claim 26, wherein the normalizer comprises a fifth comparison logic and a fifth setting logic, and the fifth setting logic is based on a comparison result of the fifth comparison logic to set the parameter A, the parameter C and the bit counter.

35. The decoding system as claimed in claim 34, wherein the fifth comparison logic compares the bit counter with zero to thereby determine if the bit counter is equal to zero, and the fifth comparison logic compares a parameter A2 with 0x8000 to thereby determine if the parameter A2 is smaller than 0x8000, where A2=A<<1 for A to indicate the parameter A and << to indicate a left shift operation.

36. The decoding system as claimed in claim 35, wherein, when the bit counter is equal to zero and the parameter A2 is smaller than 0x8000, the fifth setting logic sets the parameter A=A2, the parameter C=C2<<1 and the bit counter to seven, where C2=C+(BUFFER<<8) for BUFFER to indicate the buffer value.

37. The decoding system as claimed in claim 35, wherein, when the bit counter is equal to zero and the parameter A2 is not smaller than 0x8000, the fifth setting logic sets the parameter A=A2, the parameter C=C2 21 <1 and the bit counter to seven, where C2=C+(BUFFER <<8) for BUFFER to indicate the buffer value.

38. The decoding system as claimed in claim 35, wherein, when the bit counter is not equal to zero and the parameter A2 is smaller than 0x8000, the fifth setting logic sets the parameter A=A2, the parameter C=C <<1 and the bit counter to CT-1, where CT indicates a value of the bit counter.

39. The decoding system as claimed in claim 35, wherein, when the bit counter is not equal to zero and the parameter A2 is not smaller than 0x8000, the fifth setting logic sets the parameter A=A2, the parameter C=C2 <<1 and the bit counter to CT-1, where CT indicates a value of the bit counter.

* * * * *